(12) United States Patent
Borntrager et al.

(10) Patent No.: US 9,541,182 B2
(45) Date of Patent: Jan. 10, 2017

(54) DRIVE UNIT FOR A VEHICLE, AND OPERATING METHOD THEREFOR

(71) Applicant: ZF Friedrichshafen AG, Friedrichshafen (DE)

(72) Inventors: Kai Borntrager, Langenargen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/390,079

(22) PCT Filed: Mar. 4, 2013

(86) PCT No.: PCT/EP2013/054232
§ 371 (c)(1),
(2) Date: Oct. 2, 2014

(87) PCT Pub. No.: WO2013/152892
PCT Pub. Date: Oct. 17, 2013

(65) Prior Publication Data
US 2015/0065294 A1 Mar. 5, 2015

(30) Foreign Application Priority Data
Apr. 11, 2012 (DE) .................. 10 2012 205 823

(51) Int. Cl.
*F16H 47/06* (2006.01)
*B60K 6/48* (2007.10)
(Continued)

(52) U.S. Cl.
CPC .............. *F16H 47/06* (2013.01); *B60K 6/48* (2013.01); *B60T 1/062* (2013.01); *B60T 1/087* (2013.01);
(Continued)

(58) Field of Classification Search
CPC .......... F16D 57/04; F16D 3/097; B60T 10/02; Y10T 477/24; Y10T 477/27; F16H 2200/0082; F16H 2061/0414; Y10S 903/915
See application file for complete search history.

(56) References Cited

U.S. PATENT DOCUMENTS

| 4,117,745 A | 10/1978 | Yokoyama et al. |
| 4,699,022 A | 10/1987 | Stadt et al. |
| (Continued) | | |

FOREIGN PATENT DOCUMENTS

| DE | 31 44 902 A1 | 5/1983 |
| DE | 41 22 628 A1 | 1/1993 |
| (Continued) | | |

OTHER PUBLICATIONS

Raw translation of DE102008044202 A1, Borntraeger, Hybrid assembly for hybrid drive of motor vehicle, Jun. 2, 2010, 10 pages.*

(Continued)

*Primary Examiner* — Sherry Estremsky
*Assistant Examiner* — Lillian Nguyen
(74) *Attorney, Agent, or Firm* — Davis & Bujold, PLLC; Michael J. Bujold

(57) ABSTRACT

A drive device for a vehicle having a combustion engine and a multistage manual transmission having first and second sub-transmissions, each of which has a separate input shaft. A first input shaft of the first sub-transmission couples, via a first clutch, the combustion engine or is assigned an electrical machine. A second input shaft of a second sub-transmission couples, via a second clutch, the combustion engine. The first input shaft is additionally assigned a start-up element having at least one hydrodynamic transfer element, which has first and second functional wheels which together form a working chamber. The working chamber can (Continued)

be filled with fluid in order to generate a hydrodynamic transfer torque such that at least one start-up function, affecting the first sub-transmission, can carried out by way of the start-up element.

18 Claims, 8 Drawing Sheets

(51) Int. Cl.
   *F16H 3/097*  (2006.01)
   *B60T 1/087*  (2006.01)
   *B60W 30/18*  (2012.01)
   *F16H 3/00*   (2006.01)
   *B60T 1/06*   (2006.01)
   *B60T 10/02*  (2006.01)
   *F16D 57/04*  (2006.01)
   *F16H 61/04*  (2006.01)

(52) U.S. Cl.
   CPC ......... *B60T 10/02* (2013.01); *B60W 30/18027* (2013.01); *F16D 57/04* (2013.01); *F16H 3/006* (2013.01); *F16H 3/097* (2013.01); *F16H 61/0403* (2013.01); *B60K 2006/4825* (2013.01); *F16H 2061/0414* (2013.01); *F16H 2200/0056* (2013.01); *F16H 2200/0082* (2013.01); *F16H 2312/02* (2013.01); *Y02T 10/6221* (2013.01); *Y02T 10/6252* (2013.01); *Y10S 903/915* (2013.01); *Y10T 477/24* (2015.01)

(56) References Cited

U.S. PATENT DOCUMENTS

| | | | | |
|---|---|---|---|---|
| 5,030,179 | A * | 7/1991 | Ganoung | F16H 3/006 475/50 |
| 5,700,219 | A | 12/1997 | Ohkubo | |
| 5,954,607 | A | 9/1999 | Nitsche et al. | |
| 6,159,123 | A * | 12/2000 | Gumpoltsberger | B60K 17/02 188/140 A |
| 6,675,668 | B2 * | 1/2004 | Schamscha | F16H 61/0059 74/340 |
| 7,361,111 | B2 | 4/2008 | Aitzetmueller et al. | |
| 7,762,917 | B2 | 7/2010 | Maucher et al. | |
| 2002/0177504 | A1 * | 11/2002 | Pels | B60K 6/36 477/3 |
| 2003/0051577 | A1 * | 3/2003 | Hirt | F16H 3/006 74/664 |
| 2006/0225527 | A1 | 10/2006 | Yang et al. | |
| 2010/0078281 | A1 | 4/2010 | Kajigai et al. | |
| 2010/0173746 | A1 | 7/2010 | Ideshio et al. | |
| 2011/0024208 | A1 * | 2/2011 | Wust | B60K 6/26 180/65.22 |
| 2012/0240723 | A1 * | 9/2012 | Gluckler | B60K 6/36 74/661 |
| 2013/0109530 | A1 * | 5/2013 | Kaltenbach | B60K 6/387 477/5 |
| 2013/0288850 | A1 | 10/2013 | Kaltenbach | |
| 2013/0337961 | A1 * | 12/2013 | Kaltenbach | B60K 6/48 475/207 |
| 2014/0113759 | A1 * | 4/2014 | Menne | B60T 10/02 475/91 |

FOREIGN PATENT DOCUMENTS

| | | |
|---|---|---|
| DE | 196 29 496 A1 | 1/1997 |
| DE | 198 09 467 A1 | 9/1999 |
| DE | 198 17 865 A1 | 10/1999 |
| DE | 100 45 337 A1 | 3/2002 |
| DE | 10 2004 059 733 A1 | 6/2006 |
| DE | 20 2005 021 249 U1 | 8/2007 |
| DE | 10 2008 044 102 A1 | 6/2010 |
| DE | 10 2010 030 569 A1 | 12/2011 |
| DE | 10 2010 061 827 A1 | 5/2012 |
| DE | 10 2011 089 467 A1 | 6/2013 |
| EP | 0 879 370 B1 | 11/1998 |
| EP | 2 025 550 A2 | 2/2009 |
| WO | 2007/124711 A1 | 11/2007 |
| WO | 2009/039629 A1 | 4/2009 |
| WO | 2013/091971 A1 | 6/2013 |

OTHER PUBLICATIONS

German Search Report Corresponding to 10 2012 205 823.0 mailed Mar. 12, 2014.
German Search Report Corresponding to 10 2012 205 825.7 mailed Oct. 23, 2012.
International Search Report Corresponding to PCT/EP2013/054232 mailed Jul. 23, 2013.
International Search Report Corresponding to PCT/EP2013/054234 mailed Apr. 29, 2013.
Written Opinion Corresponding to PCT/EP2013/054232 mailed Jul. 23, 2013.

* cited by examiner

DRIVE UNIT FOR A VEHICLE, AND OPERATING METHOD THEREFOR

This application is a National Stage completion of PCT/EP2013/054232 filed Mar. 4, 2013, which claims priority from German patent application serial no. 10 2012 205 823.0 filed Apr. 11, 2012.

FIELD OF THE INVENTION

The invention relates to a drive device for a vehicle according to the preamble of claim 1, and to an operating method.

BACKGROUND OF THE INVENTION

Drive devices of vehicles, comprising manual transmissions having two sub-transmissions or functionally comparable, separate transmission trains, which can usually be shifted automatically or in an automated manner, are already known. Certain functions of such a drive are usually assigned to only one of the two sub-transmissions, or can only be implemented thereby, and therefore asymmetrical loads can occur on the sub-transmissions, or certain functions are mutually exclusive or are available only with limitations.

In a double clutch transmission, for example, usually one of two input-side power-shift transmissions is also always used as a start-up clutch, since the preferred start-up gear is located in the applicable sub-transmission. If the drive is subject to frequent start-up procedures, as is the case with a city bus, for example, this can result in thermal overload with premature wear of the applicable clutch.

In a hybrid drive derived from a double clutch transmission or the like, functionalities assigned to the sub-transmissions can make certain limitations necessary. For example, it is not possible to switch from a generator mode of an electric machine assigned to one of the sub-transmissions into a start-up procedure without delay. In addition, operation in a creep mode, i.e., driving at a constant low speed, is usually not possible in a generator mode. Further limitations can result when starting the internal combustion engine in an electric driving mode. In order to start the internal combustion engine and retain the tractive force in the drive train, it is usually necessary to utilize a second electric machine as a starter-generator, or an additional friction clutch, which must be designed large enough for frequently recurring start-up procedures.

In the case of vehicle transmissions subject to high loads on the start-up and braking devices thereof, such as automatic power-shift transmissions for city busses, for example, in the case of which start-up and braking procedures occur frequently and in close succession, it is known to equip such vehicle transmissions with a hydrodynamic torque converter as a wear-free start-up element and, possibly, with an additional wear-free constant-braking device, such as a hydrodynamic retarder. In such hydrodynamic transfer elements, the mechanical energy of a drive shaft is converted into the kinetic energy of a fluid, with generation of heat, and back into the mechanical energy of an output shaft. A simple fluid coupling comprising a driving impeller and a driven turbine functions as a continuously variable transmission having different speeds of rotation on the input side and the output side. In a torque converter, an additional stator redirects the flow in the direction of the impeller and thereby increases the torque in the torque conversion. In a retarder, a fixed turbine blade wheel, the stator, generates a braking effect on the driving wheel, the rotor, and thereby induces a braking effect on the drive train.

Start-up retarders mentioned above are known for the purpose of minimizing the required design complexity and the production costs, the start-up retarders combining the functions of a hydrodynamic start-up element, such as a fluid coupling or a torque converter, and a hydrodynamic retarder, in one unit.

A hydrodynamic clutch comprising an impeller and a turbine is used in such a drive system known from DE 100 45 337 A1, wherein the impeller is connected to a drive motor and a friction clutch is engaged in parallel in order to lock up the impeller and the turbine, and wherein the turbine is connected to a transmission input of a downstream manual transmission by means of a freewheel, and can be fixed on a housing by means of a turbine brake. At start-up, power is transferred to the transmission input by means of the hydrodynamic circuit. In braking, the turbine is fixedly braked and the friction clutch is engaged. Filling the hydrodynamic clutch with a fluid permits the hydrodynamic clutch to function as a primary retarder.

EP 0 879 370 B1 discloses a transmission unit comprising a hydraulic transmission part, which has a primary blade wheel and a secondary blade wheel, which together form a working chamber, which can be filled with fluid, and comprising a mechanical transmission part disposed separately downstream thereof relative to the drive train, as the actual vehicle transmission. The mechanical transmission part can be, for example, a planetary transmission having one or more coupled planetary gear sets and a plurality of forward gear steps and reverse gear steps. The hydraulic transmission part can be operated in two operating states, namely in a driving state as a hydrodynamic clutch and in a braking state as a hydrodynamic retarder. In a start-up procedure, the primary blade wheel functions as an impeller, and the secondary blade wheel functions as a turbine. In a braking procedure, the primary blade wheel is fixed and functions as a stator, and the secondary blade wheel is connected to the transmission and then functions as a rotor rotating in the reverse direction due to the opposite direction of flow. The hydraulic transmission part is assigned a plurality of shift elements, which, together with further shift elements of the mechanical transmission part, act on each of the blade wheels and couple one of the blade wheels or both blade wheels to the transmission, or bypass or fix one of the blade wheels or both of the blade wheels. Vehicle operation is implemented in each case by means of one forward gear step or one reverse gear step with the start-up retarder disengaged or bypassed. Braking action is implemented in each case by means of one reverse gear step with the primary blade wheel fixed.

DE 198 17 865 A1 discloses a start-up retarder comprising a hydrodynamic retarder and a planetary gear set, which form one unit. The start-up retarder makes it possible to implement a hydrodynamic start-up procedure with an additional start-up transmission ratio and hydrodynamic braking action. The retarder comprises a rotatable rotor blade wheel and a fixed stator blade wheel. The rotor is connected or connectable to a sun gear of the planetary gear set and is connected or connectable to a planet carrier. The planet carrier is connected or connectable to an engine-side drive shaft or to a transmission-side output shaft of the planetary gear set. A ring gear is therefore connected either to the output shaft or to the drive shaft. The retarder is designed as a so-called double-flow retarder. This comprises two flow circuits having two outer, axially opposed stators, each of which has inwardly facing blades, and an axially inner rotor having blades mounted on both sides. The rotor can therefore generate sufficiently high braking power in both of the possible rotational directions thereof.

SUMMARY OF THE INVENTION

Proceeding therefrom, the problem addressed by the invention is that of creating an improved drive device for a vehicle having sub-transmissions, which is comfortable and has a long service life, in particular in light of frequent start-up and stopping procedures. A further problem is that of providing a method for operating such a drive device.

This problem is solved by the features of the invention as described below.

The invention is based on the finding that a vehicle transmission in which an input clutch or an electric machine is used as a power-shift means or as a start-up means, as is common with double clutch transmissions and hybrid transmissions, can be supplemented with an additional hydrodynamic start-up element. Such a hydrodynamic start-up element, which acts on a transmission path having a start-up gear, can decouple the aforementioned power-shift clutch or the electric machine from the function of a start-up element. The power-shift clutch or the electric machine can therefore be used during vehicle operation in a more flexible manner and can be protected against increased wear.

The invention therefore relates to a drive device for a vehicle, comprising an internal combustion engine and a transmission designed as a multistage manual transmission having two sub-transmissions, each of which has a separate transmission input shaft, wherein a first transmission input shaft of a first sub-transmission is assigned a first clutch, by means of which the first transmission input shaft can be drivingly connected to the internal combustion engine, or is assigned an electrical machine, and wherein a second transmission input shaft of a second sub-transmission is assigned a second clutch, by means of which the second transmission input shaft can be drivingly connected to the internal combustion engine.

According to the invention, in order to solve the problem addressed with respect to the device, the first transmission input shaft is additionally assigned a start-up element, which comprises at least one hydrodynamic transfer element, which has a first functional wheel and a second functional wheel, which form a working chamber, which can be filled with fluid in order to generate a hydrodynamic transfer torque such that at least one start-up function affecting the first sub-transmission can be implemented by means of the start-up element.

In order to operate a drive device of a vehicle, which comprises an internal combustion engine and a transmission designed as a multistage manual transmission having two sub-transmissions, each of which has a separate transmission input shaft, wherein a first transmission input shaft of a first sub-transmission is assigned a first clutch, by means of which the first transmission input shaft can be drivingly connected to the internal combustion engine, or is assigned an electrical machine, and wherein a second transmission input shaft of a second sub-transmission is assigned a second clutch, by means of which the second transmission input shaft can be drivingly connected to the internal combustion engine, it is provided according to the invention that at least one hydrodynamic start-up function is implemented by means of a start-up element, wherein the start-up element is assigned to the first transmission input shaft and has a hydrodynamic transfer element, which has a first functional wheel and a second functional wheel, which form a working chamber, which can be filled with fluid in order to generate a hydrodynamic transfer torque.

This drive device therefore comprises a base transmission having two sub-transmissions, in which a hydrodynamic start-up element is disposed at the input shaft of one of the two sub-transmissions. As a result, the initially mentioned asymmetrical loads or functional limitations of conventional drive devices can be largely prevented, thereby improving the driving comfort and reducing wear. The embodiment of the drive device having two sub-transmissions makes it possible to bypass the hydrodynamic start-up element when the second sub-transmission is used to operate the vehicle, thereby improving the efficiency and the cost-effectiveness of the drive device compared to a transmission in which a hydrodynamic start-up element is always incorporated in the power path. The base transmission, comprising the transmission having the two sub-transmissions and the hydrodynamic start-up element, can be combined with a double clutch module, in particular, or with a hybrid module.

The base transmission can therefore be used as a modular component for a double clutch transmission, in which the double clutch is used as a power-shifting device for a sequential shift sequence without interruption of tractive force. The double clutch or one of the two power-shift clutches is not needed as a start-up element in this case and, therefore, is not overloaded by frequently recurring start-up procedures. This function is performed by the hydrodynamic start-up element, which permits wear-free start-up in a gear of the associated sub-transmission.

The base transmission can also be used as a modular component for a hybrid drive, in which an electric machine, which is assigned to one of the two sub-transmissions, permits a shift sequence with electric tractive-force support by virtue of the fact that this electric machine replaces a corresponding power-shift clutch. The start-up function is also performed by the hydrodynamic start-up element in this case. This has the advantage that the electric machine can be operated, independently of a start-up procedure, as a generator for charging an electric accumulator and/or for supplying electric consumers in the vehicle electrical system.

The start-up element can be designed as a start-up retarder, comprising a hydrodynamic transfer element having a first rotatable functional wheel and a second rotatable functional wheel, having a planetary gear set with a ring gear, a sun gear, and a planet carrier, wherein the planet carrier guides a plurality of planet gears, which are enmeshed with the sun gear and the ring gear, and having a shift element for fixing one of the two functional wheels, wherein the hydrodynamic transfer element and the planetary gear set are coupled to one another and, together, form one unit. The shift element can be designed as a simple form-locking claw shift element or as a friction-locking brake.

According to one embodiment of the method, start-up can be carried out by means of such a start-up retarder by filling the working chamber of the start-up retarder and thereby building up a hydrodynamic transfer torque. In this case, one of the two planetary gear set elements, either the ring gear or the sun gear, acts as a drive element of the planetary gear set, which is driven by the drive motor. The other of the two planetary gear set elements, either the ring gear or the sun gear, which is connected to the first functional wheel in a rotationally fixed manner and can be fixed on a rotationally fixed component by means of the shift element, is fixed via engagement of the shift element when the speed of rotation of the planetary gear set element crosses zero. The planet carrier, which is connected to the second functional wheel in a rotationally fixed manner, acts as a driven element of the planetary gear set that drives the transmission input shaft of the first sub-transmission.

When the working chamber is filled or partially filled with fluid and the shift element is disengaged, the start-up retarder functions as a fluid coupling without torque multiplication. When the working chamber is filled or partially filled with fluid and the shift element is engaged, the start-up retarder functions as a retarder. Due to a suitable coupling with the planetary gear set, the algebraic sign of the rotational speed differential at the fluid coupling is the same in the start-up mode and in the retarder mode. A relatively complex double-flow design of the fluid coupling for both directions of rotation is therefore not required.

In contrast to conventional start-up retarders, in the start-up retarder according to the invention, a rotational speed differential between the functional wheels remains, wherein, when the working chamber is filled, the driving functional wheel rotating in reverse, opposite to the direction of rotation of the drive source, approaches the zero crossing of the rotational speed thereof, while the speed of rotation of the driven functional wheel increases in a manner corresponding to the associated transmission input shaft, whereupon the vehicle begins moving with the start-up gear engaged.

If an appropriately defined rotational speed window is reached at a speed of rotation close to zero, the shift element can be engaged without load, whereby the associated functional wheel is fixedly braked. The hydrodynamic transfer element is thereby switched from a fluid-coupling setting into a retarder setting. If the working chamber is subsequently drained and the retarder is therefore deactivated, the planetary gear set functions as a fixed input gear ratio of the applicable sub-transmission.

According to the method, it is also possible to reduce a drive torque of the internal combustion engine or the electric machine accordingly by reducing the hydrodynamic transfer torque by at least partially draining the working chamber after the shift element is engaged.

The drive torque of the internal combustion engine is advantageously reduced as the transfer torque of the fluid coupling is reduced, in order to maintain a constant or continuously variable transmission input torque at the input shaft of the associated sub-transmission. Since the hydrodynamic torque is reduced when the shift element is engaged, the start-up retarder is in a retarder setting, although this is deactivated.

In order to activate the retarder, a hydrodynamic transfer torque can be built up by filling the working chamber, with the shift element engaged and, therefore, with the first functional wheel fixed. A braking effect on the drive can therefore be generated. The braking torque can be metered by metering the fill level of the working chamber.

The two sub-transmissions, together with the start-up retarder, form a base transmission. In the case of a double clutch transmission, a double clutch can be disposed upstream or downstream of the base transmission relative to the drive train.

In one embodiment, the two sub-transmissions can therefore form a double-clutch transmission, in which two clutches are present, wherein one clutch is assigned to one sub-transmission in each case, wherein the two clutches are designed as a double clutch, are disposed upstream of the start-up element relative to the drive train, and are drivingly connected to the internal combustion engine on the input side. On the output side, a first clutch is connected to an input element of the planetary gear set in a rotationally fixed manner by means of a clutch output shaft, while a second clutch is connected to the second transmission input shaft in a rotationally fixed manner.

Furthermore, in the case of a double clutch transmission comprising a start-up retarder and a double clutch disposed upstream of the start-up retarder relative to the drive train, one of the two planetary gear set elements, either the ring gear or the sun gear, is connected to the first functional wheel of the hydrodynamic transfer element in a rotationally fixed manner and can be fixed on a stationary component by means of the shift element, the other of the two planetary gear set elements, either the ring gear or the sun gear, is connected to an output shaft of a first clutch in a rotationally fixed manner, the planet carrier is connected on the drive side to the second functional wheel in a rotationally fixed manner, and the planet carrier is connected on the output side to the first transmission input shaft in a rotationally fixed manner.

This drive permits a hydrodynamic start-up function to be set by means of a first sub-transmission, with the shift element disengaged and the first clutch engaged, wherein the fluid coupling transfers the drive torque of the internal combustion engine without torque multiplication. During the start-up procedure, that is, with the shift element still disengaged, a power shift can already take place between the two clutches in order to achieve the shortest possible shift time for a subsequent shifting procedure. This has an advantageous effect on the performance of the drive in start-up procedures with high acceleration.

During vehicle operation in the gears of the second sub-transmission, the start-up retarder can be decoupled from the drive by disengaging the associated first clutch and the shift element or by disengaging the first clutch and shifting the first sub-transmission into neutral. Unnecessary drag losses of the start-up retarder are thereby avoided. According to the second possibility, the shift element can remain engaged, thereby eliminating the need for synchronization for re-engagement.

The second sub-transmission also makes it possible to shift a direct gear to the transmission input by means of the second clutch while bypassing the start-up retarder, since the start-up retarder acts exclusively on the first sub-transmission. A lock-up clutch of the start-up retarder, which would cause the planetary gear set to operate in direct drive, is therefore not required in order to establish a direct connection between the internal combustion engine and the transmission. A direct gear of the overall transmission can also be implemented by engaging a direct connection of the second transmission input shaft to the transmission output shaft by means of a preferably available shifting clutch at the transmission input of the second sub-transmission. The direct gear is not impaired by drag losses at the start-up retarder and therefore has high efficiency.

When the shift element is engaged and the hydrodynamic transfer element is activated, the start-up retarder can function as a retarder. The retarder function can be implemented by braking the input shaft of the first sub-transmission when a gear is engaged in the first sub-transmission. Another way to generate a braking effect is to engage both clutches when a gear is engaged in the second sub-transmission and a gear is not engaged in the first sub-transmission.

The two sub-transmissions, together with the start-up retarder, form a base transmission. In the case of a hybrid transmission, a clutch and an electric machine can be disposed upstream of the base transmission.

In a further embodiment, the two sub-transmissions can therefore form a hybrid transmission, in which a clutch and an electric machine are provided, wherein the electric machine is assigned to the first sub-transmission, is disposed upstream of the start-up element, and is connected to an input element of the planetary gear set in a rotationally fixed manner by means of a drive shaft. The clutch is assigned to the second sub-transmission, is disposed upstream of the start-up element relative to the drive train, and has a clutch input shaft on the input side, which is drivingly connected to the internal combustion engine, and the clutch is connected on the output side to the second transmission input shaft in a rotationally fixed manner. A coupling shift element is also provided, by means of which the two transmission input shafts can be coupled to one another.

In such an arrangement of a hybrid transmission, comprising the aforementioned start-up retarder, a clutch disposed upstream of the start-up retarder, and the electric machine disposed upstream, the start-up retarder can be implemented in the drive by connecting one of the two planetary gear set elements, either the ring gear or the sun gear, to the first functional wheel of the hydrodynamic transfer element in a rotationally fixed manner and fixing the planetary gear set element on a stationary component in a rotationally fixed manner, while connecting the other of the two planetary gear set elements, either the ring gear or the sun gear, to a drive shaft of the electric machine in a rotationally fixed manner, and connecting the planet carrier on the drive side to the second functional wheel in a rotationally fixed manner and, on the output side, to the first transmission input shaft in a rotationally fixed manner.

In this drive device, a first clutch is omitted as compared to the double clutch transmission. Instead, a coupling shift element is provided for coupling the two transmission input shafts in order to ensure that the internal combustion engine can utilize the gears of the first sub-transmission despite the omission of the first clutch. The electric machine functions as a power-shift element. The start-up function is implemented by the start-up retarder.

In a driving mode relying exclusively on an electric motor, i.e., with the internal combustion engine switched off, this hybrid output drive allows start-up to be implemented by means of the hydrodynamic start-up retarder. The electric machine permits start-up to be implemented without delay proceeding from a generator mode. In addition, a creep mode can be implemented simultaneously with the generator mode. Furthermore, the internal combustion engine can be started proceeding from a driving mode relying exclusively on an electric motor while retaining the tractive force in the drive train, wherein fluctuations in torque or speed of rotation can be dampened by means of the fluid coupling.

When power shifts are implemented in an operating mode driven by the internal combustion engine, torque can be supported at the output drive by means of the electric machine. A method therefor is described in the applicant's document DE 10 2010 030 569 A1, which was not previously published, and can be adapted to the drive device according to the invention. Power shifts can also be implemented, in principle, with the aid of the fluid coupling in a driving mode relying exclusively on an electric motor. Reference is made in this regard to the applications DE 10 2010 061 827 A1 and DE 10 2011 089 467 A1, which were not previously published. The methods described therein can also be adapted to a drive according to the invention.

In the hybrid drive described, the electric motor is not directly coupled to the transmission input. Potential vibrations in the drive train caused by the mass of the electric motor are therefore largely avoided.

It is also possible to avoid a so-called standstill derating when the electric machine is used in a configuration according to the invention, wherein, given a speed of rotation of zero, the standstill derating would result in a unilateral load in an inverter cooperating with the electric machine and thereby limit the drive torque of the electric machine.

An embodiment of the invention without an input-side clutch at all is also basically possible. The two sub-transmissions can therefore form a hybrid transmission, in which an electric machine is provided, wherein the electric machine is assigned to the first sub-transmission, is disposed upstream of the start-up element relative to the drive train, and is connected to an input element of the planetary gear set in a rotationally fixed manner by means of a drive shaft. The second transmission input shaft, which is assigned to the second sub-transmission, is drivingly connected to the internal combustion engine. A coupling shift element is also provided, by means of which the two transmission input shafts can be coupled to one another.

In this configuration, which reduces production costs and construction space, not all of the aforementioned functions are available, however. In particular, it is not possible in this case to start the internal combustion engine while retaining tractive force proceeding from a driving mode relying exclusively on an electric motor.

In addition, in the case of a hybrid transmission comprising a start-up retarder and an electric machine, a hydraulic fluid pump connected to a drive shaft of the electric machine can be disposed between the electric machine and the start-up retarder. A hydraulic fluid pump, which is conventionally driven separately, can be omitted due to this auxiliary assembly, since all start-up procedures can be carried out by means of the hydrodynamic fluid coupling, i.e., even in a driving mode relying exclusively on an electric motor. The pump can also be operated when the vehicle is at a standstill and can provide hydraulic pressure medium and coolant as needed.

According to a further embodiment of the invention, the hydrodynamic transfer element can comprise a third functional wheel, which is fixedly disposed between the first functional wheel and the second functional wheel such that the hydrodynamic transfer element forms a hydrodynamic torque converter.

It is therefore possible to use a torque converter instead of a simple fluid coupling, wherein the torque converter multiplies torque, as is the case with known hydrodynamic torque converters. In this case, the first and the second functional wheel function as an impeller and a turbine, respectively, and the third functional wheel functions as a stator. When such a torque converter is used, there is no need to adjust the torque of the driving assembly, i.e., the internal combustion engine or, possibly, the electric machine, as is preferably the case with the simple fluid coupling, in the event of a load transfer between the torque converter and the shift element that fixedly brakes the first functional wheel after the zero crossing in a start-up procedure. The torque adjustment can also be omitted in the reverse case, i.e., in the event of a load transfer from the engaged shift element into the retarder mode when the working chamber is filled.

In another embodiment of the invention, the start-up element can be designed as a double-flow start-up retarder, comprising a hydrodynamic transfer element having two first, fixed functional wheels and one second, rotatable functional wheel, which form two working chambers having two hydraulic circuits, wherein one hydraulic circuit operates in one direction of rotation of the rotatable functional wheel in each case. This double-flow start-up retarder further comprises a planetary gear set, which has a ring gear, a sun gear, arid a planet carrier guiding a plurality of planetary gears, wherein the planetary gears are enmeshed with the sun gear and the ring gear, and comprises a lock-up clutch for coupling two planetary gear set elements. The hydrodynamic transfer element and the planetary gear set are coupled to one another and, together, form one unit.

For example, the two first functional wheels are two axially outer stators, and the second functional wheel is an inner rotor. The two stators are disposed axially opposite one another. The rotor is rotatably disposed therebetween and has blades mounted on both sides thereof. The rotor and the two stators form one hydraulic circuit in each case. A comparable start-up retarder is known per se from the initially mentioned document DE 198 178 65 A1. It is possible to adapt such a start-up retarder to a vehicle transmission comprising two sub-transmissions according to the invention.

This can be implemented in the case of a double clutch transmission comprising a double clutch disposed upstream of this double-flow start-up retarder by connecting one of the two planetary gear set elements, either the ring gear or the sun gear, to an output shaft of a first clutch in a rotationally fixed manner, connecting the other of the two planetary gear set elements, either the ring gear or the sun gear, to the second functional wheel, connecting the planet carrier on the output side to the first transmission input shaft in a rotationally fixed manner, and connecting the one of the two planetary gear set elements connected to the second functional wheel in a rotationally fixed manner, i.e., either the ring gear or the sun gear, to the planet carrier by means of a lock-up clutch in a rotationally fixed manner such that a hydrodynamic start-up function is set when the lock-up clutch is disengaged and a hydrodynamic retarder function is set when the lock-up clutch is engaged.

In this double-flow start-up retarder, the planetary gear set element connected to the second functional wheel, i.e., the sun gear, for example, is braked in a start-up procedure and a transmission input torque is simultaneously built up. This procedure is associated with torque multiplication. By engaging the preferably friction-locking lock-up clutch, the sun gear can be coupled to the planet carrier and, therefore, to the rotating functional wheel, i.e., to the rotor of the start-up retarder. A retarder mode can be implemented as a result. Since the direction of rotation between the rotor and the stator reverses as a result, it makes sense to switch the flow from the first hydraulic circuit into the second hydraulic circuit. As a result, correspondingly oriented blades of the functional wheels are effective at start-up and during braking, thereby making it possible to achieve a comparable level of hydrodynamic start-up torque or a hydrodynamic braking torque, respectively.

The arrangement also allows power shifts to be implemented between the two clutches of the double clutch transmission without the need to terminate the start-up procedure by engaging the lock-up clutch. Instead, the start-up procedure can be terminated by means of the power shift. This makes it possible to design the lock-up clutch to be smaller and, therefore, more cost-effective.

Such a double-flow start-up retarder can also be used in a hybrid transmission having only one clutch and one electric machine, wherein the clutch and the electric machine can be disposed upstream of the start-up retarder relative to the drive train. To this end, one of the two planetary gear set elements, either the ring gear or the sun gear, can be connected to a drive shaft of an electric machine in a rotationally fixed manner, the other of the two planetary gear set elements, either the ring gear or the sun gear, can be connected to the second functional wheel in a rotationally fixed manner, the planet carrier can be connected on the output side to the first transmission input shaft in a rotationally fixed manner, and the one of the planetary gear set elements, either the ring gear or the sun gear, that is connected to the second functional wheel in a rotationally fixed manner, can be connected to the planet carrier in a rotationally fixed manner by means of a lock-up clutch.

Similar to the embodiment of the drive device comprising a single-flow start-up retarder, this arrangement makes it possible to implement a hydrodynamic start-up by means of the fluid coupling in a driving mode relying exclusively on an electric motor. A start-up procedure with the lock-up clutch engaged, i.e., a mechanical start-up, is basically also possible. Vibration decoupling of the electric machine is also provided. The aforementioned standstill derating in the inverter can also be avoided.

Another possibility is a hybrid arrangement comprising the one double-flow start-up retarder with the omission of the input-side coupling, since the two transmission input shafts can still be decoupled or coupled to one another by means of a coupling shift element. The drive shaft of the internal combustion engine can then be connected to the input shaft of the second sub-transmission in a rotationally fixed manner.

This arrangement also makes it possible to implement start-up without delay, proceeding from a generator mode, and permits a creep mode to be implemented simultaneously with a generator mode. It is also possible to start the internal combustion engine while retaining the tractive force with slip decoupling from the transmission. A corresponding method therefor is known per se from the aforementioned document DE 10 2011 089 467 A1, which was not previously published.

A method for implementing a power shift during driving by an internal combustion engine by means of support by the electric machine can be derived, in the case of this transmission arrangement, from a method that is described in the applicant's document DE 10 2010 030 569 A1, which was not previously published.

Power shifts can be implemented in a vehicle operation mode relying exclusively on an electric motor with the aid of the lock-up clutch, with the retarder function deactivated. In this regard, reference is made once more to the application DE 10 2011 089 467 A1 which belongs to the applicant.

In the aforementioned example embodiments, a double clutch is disposed upstream of the start-up retarder relative to the drive train, or a clutch and an electric machine are disposed upstream of the start-up retarder. In this case, the start-up retarder with the vehicle transmission comprising two sub-transmissions functionally forms a base transmission, upstream of which, relative to the drive train, either a double clutch module or a hybrid module is disposed. When the hydrodynamic transfer element is deactivated, the planetary gear set of the start-up retarder is an input gear ratio of the applicable first sub-transmission.

An arrangement is also possible, however, in which two single clutches are disposed between the start-up retarder and the transmission and perform the function of a double clutch.

It is also possible, however, for the two sub-transmissions to form a double clutch transmission, in which two clutches are provided, wherein one clutch is assigned to one sub-transmission in each case, wherein the two clutches are designed as single clutches, are disposed downstream of the start-up element relative to the drive train, and each comprise a separate clutch input shaft on the input side, wherein a first clutch is assigned to the first sub-transmission and is connected on the input side, by means of the clutch input shaft thereof, to an element of the planetary gear set, in a rotationally fixed manner and, on the output side, is connected to the first transmission input shaft in a rotationally fixed manner, and wherein a second clutch is assigned to the second sub-transmission and is drivingly connected on the input side, by means of the clutch input shaft thereof, to the internal combustion engine and, on the output side, is connected to the second transmission input shaft in a rotationally fixed manner.

In terms of the interaction of the two single clutches with the single-flow start-up retarder, one of the two planetary gear set elements, either the ring gear or the sun gear, can be connected to the first functional wheel of the hydrodynamic transfer element in a rotationally fixed manner and can be fixed on a stationary component by means of the shift element, the other of the two planetary gear set elements, either the ring gear or the sun gear, can be drivingly connected to the internal combustion engine and can be connected to a clutch input shaft of a second clutch in a rotationally fixed manner, and the planet carrier is connected on the drive side to the second functional wheel in a rotationally fixed manner and, on the output side, is connected to a clutch input shaft of a first clutch in a rotationally fixed manner.

In this arrangement, a hydrodynamic start-up function is activated when the shift element is disengaged and a hydrodynamic retarder function is activated when the shift element is engaged.

In all the embodiments mentioned, each of the two sub-transmissions can be designed as an auxiliary transmission, wherein the two transmission input shafts are disposed coaxially relative to one another, wherein a common transmission output shaft is disposed coaxially behind the transmission input shafts, wherein the first transmission input shaft assigned to the first sub-transmission is designed as an external hollow shaft, in which the second transmission input shaft assigned to the second sub-transmission is disposed and extends out of the first transmission input shaft on the transmission side, wherein the sub-transmissions are each assigned one of two countershafts, disposed coaxially over one another, and which are drivingly connected to the respective transmission input shaft in each case by means of one gear plane having two enmeshed gear wheels, wherein the sub-transmissions comprise further gear planes, in which enmeshed gear wheels are disposed, the gear wheels being designed as idler gears or fixed gears and each being connected to one of the shafts in a rotationally fixed manner or being connectable by means of shifting devices to one of the shafts in a rotationally fixed manner in each case such that a group of gears having odd gears with at least one start-up gear and at least one reverse gear is assigned to the first sub-transmission, and at least one group of gears having even gears is assigned to the second sub-transmission.

This transmission structure is particularly well suited for interaction with a hydrodynamic start-up element, which acts on one of the two sub-transmissions. Other transmission structures having two sub-transmissions are also possible, however. In terms of the gear set, it is essential that a start-up gear be disposed in the sub-transmission to which the hydrodynamic start-up element is assigned. Preferably, a reverse gear is also disposed in this sub-transmission, in order to permit implementation of frequent start-up procedures hydrodynamically and, therefore, in a wear-free manner, both forward and in reverse.

BRIEF DESCRIPTION OF THE DRAWINGS

To illustrate the invention, drawings having a plurality of example embodiments follow the description. In the drawings.

DETAILED DESCRIPTION OF THE PREFERRED EMBODIMENTS

Figure 1:
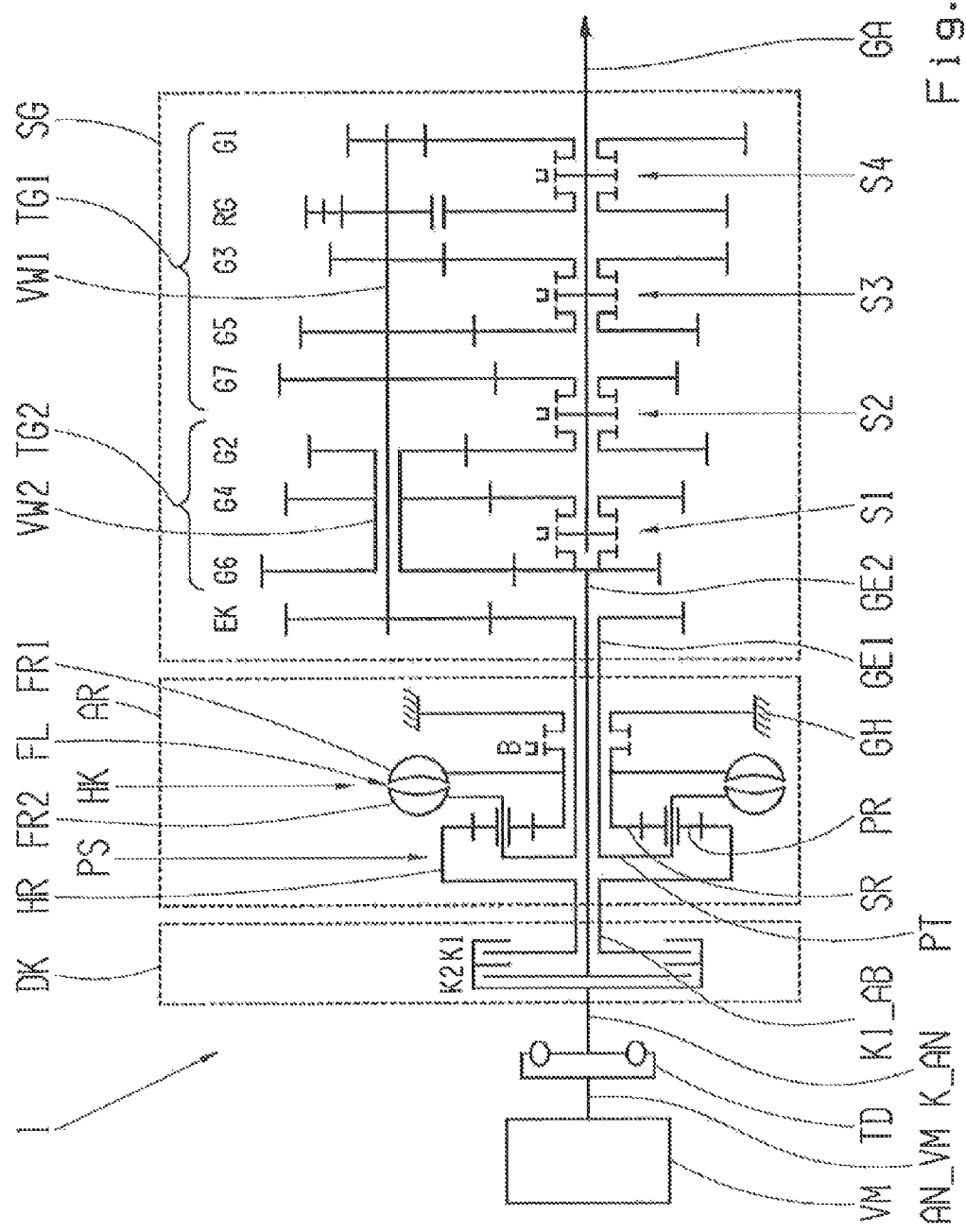
FIG. 1 shows a drive device for a vehicle, comprising a double clutch transmission and a start-up retarder having a fluid coupling, and comprising a double clutch disposed upstream of the start-up retarder relative to the drive train.

For simplicity, components that are the same or are functionally equivalent are labeled with the same reference characters.

FIG. 1 shows a drive device for a vehicle, comprising a double clutch transmission 1, which has a multistage, automated manual transmission SG having two sub-transmissions TG1, TG2, one start-up retarder AR, one double clutch DK having two friction clutches K1, K2, one vibration damper TD, and one internal combustion engine VM.

The manual transmission SG has a countershaft design and comprises, in all, seven forward gears G1, G2, G3, G4, G5, G6, G7 and one reverse gear RG, which can be shifted by means of four double-sided shifting groups S1, S2, S3, S4. Since the design of an auxiliary transmission is known per se and the mode of operation of the individual gearwheels, which are designed as idler gears and fixed gears, of such a transmission is irrelevant to the invention, an explicit description of the individual gearwheels will be omitted, for simplicity.

The first sub-transmission TG1 provides a group of gears having the odd gears G1, G3, G5 G7 and one reverse gear RG. The second sub-transmission TG2 provides a group of gears having the even gears G2, G4, G6. The double clutch DK basically enables a sequential shift sequence to be implemented without interruption of tractive force, wherein one gear is active in one of the two sub-transmissions TG1, TG2, and a subsequent gear is preselected in the respective other sub-transmission TG1, TG2. The gear shift is implemented in a known manner by the overlapping disengagement and engagement of the two clutches K1, K2.

The two sub-transmissions TG1, TG2 each have a separate transmission input shaft GE1, GE2, respectively, and have a common transmission output shaft GA. The two transmission input shafts GE1, GE2 are disposed coaxially relative to one another, wherein a first transmission input shaft GE1, which is assigned to the first sub-transmission TG1, is designed as an external hollow shaft, in which the second transmission input shaft GE2 assigned to the second sub-transmission TG2 is disposed as the inner shaft, and extends out of the first transmission input shaft on the transmission side.

The forward gears G1, G2, G3, G4, G5, G6, G7 are each disposed in a gear plane having two enmeshed gear wheels. The reverse gear RG also comprises a rotation-reversing gearwheel. The gear wheels designed as idler gears are disposed on the transmission output shaft GA and can be connected thereto in a rotationally fixed manner by means of the respective shifting device S1, S2, S3, S4. The gear wheels of the two sub-transmissions TG1 TG2 designed as fixed gears are located on a countershaft VW1, VW2, respectively. The two countershafts VW1, VW2 are disposed coaxially relative to one another, wherein the short second countershaft VW2 is assigned to the second sub-transmission TG2 and is disposed, as a hollow shaft, over the inner first countershaft VW1, which is assigned to the first sub-transmission TG1, and extends out of both sides of the hollow shaft.

The transmission input shaft GE1 of the first sub-transmission TG1 is drivingly connected to the associated first countershaft VW1 by means of an input constant EK having two enmeshed gear wheels. The transmission input shaft GE2 of the second sub-transmission is drivingly connected to the associated second countershaft VW2 by means of the first gear plane of the second sub-transmission TG2. The transmission input shaft GE2 of the second sub-transmission TG2 can be connected directly to the transmission output shaft GA by means of a first shift element S1. The sixth gear is therefore engaged as a direct gear, the sixth gear being assigned to the first gear plane of the second sub-transmission TG2, as is evident in FIG. 1, The second sub-transmission TG2 therefore enables a direct gear to be implemented while bypassing the start-up retarder AR, i.e., without torque losses resulting from gear engagements of the planetary gear set PS and without drag torque losses resulting from the fluid coupling HK.

The two clutches K1, K2 are combined in one double clutch DK. The clutch input sides are drivingly connected to a drive shaft AN_VM of an internal combustion engine VM by means of a common clutch drum and by means of a common clutch input shaft K_AN. A vibration damper TD is disposed between the double clutch DK and the internal combustion engine VM for the purpose of damping vibrations. The first clutch K1, which is assigned to the first sub-transmission TG1, is connected on the output side in a rotationally fixed manner by means of an output shaft K1_AB to an input element HR of the start-up retarder AR, which is described in the following. The second clutch K2, which is assigned to the second sub-transmission TG2, is directly connected on the output side to the second transmission input shaft GE2 in a rotationally fixed manner, The start-up retarder AR is disposed between the double clutch DK and the manual transmission SG and comprises a hydrodynamic transfer element HK and a planetary gear set PS. The planetary gear set PS comprises an outer ring gear HR, as the input element, a central sun gear SR, and a planet carrier PT, wherein the planet carrier PT carries a plurality of planetary gears PR enmeshed with the ring gear HR and the sun gear SR.

The hydrodynamic transfer element HK comprises a first functional wheel FR1 and a second functional wheel FR2. The two functional wheels FR1, FR2 are designed as blade wheels, which are opposite one another and are disposed so as to be rotatable. These form a non-explicitly depicted working chamber FL, which is usually toroidal and can be filled with a fluid, for example, oil, by means of a non-illustrated hydraulic circuit. The hydraulic circuit can regulate the manner in which the working chamber FL is acted upon with the fluid and is relieved of the fluid. A shift element B is disposed between the first functional wheel FR1 and a rotationally fixed component GH, for example, a housing. The shift element B is designed as a form-locking claw in FIG. 1, although this can also be designed as a friction-locking brake and is therefore also referred to as a brake in the following.

The planetary gear set PS and the hydrodynamic transfer element HK are coupled to one another. The ring gear HR of the planetary gear set PS is connected to the first clutch K1 in a rotationally fixed manner. The sun gear SR is connected to the first functional wheel FR1 and, together with the functional wheel FR1, can be fixedly braked or fixed on the housing GH by means of the shift element B. The planet carrier PT is connected to the first transmission input shaft GE1 and, therefore, to the first sub-transmission TG1 of the vehicle transmission SG and to the second functional wheel FR2. The hydrodynamic transfer element HK is therefore engaged between the sun gear SR and the planet carrier PT.

The double clutch transmission 1 comprising the start-up retarder AR has the following properties:

When the brake B is disengaged, the start-up retarder AR functions as a fluid coupling without torque multiplication. In order to implement a hydrodynamic start-up procedure, a start-up gear, such as the first gear G1, for example, is engaged in the first sub-transmission TG1 and the associated first clutch K1 of the double clutch DK is engaged. The clutch K1 is therefore not loaded in slip, which is advantageous. Instead, the start-up retarder AR or the hydrodynamic transfer element HK is in slip while the working chamber FL is being filled and transfers the drive torque of the internal combustion engine VM. The sun gear SR rotates in reverse, because the planet carrier PT is initially at a standstill with the transmission input shaft GE1.

As the speed of rotation of the transmission input shaft GE1 increases and, therefore, as the driving speed increases, the speed of rotation of the sun gear SR decreases toward zero. When the zero crossing is reached, the shift element or the brake B is engaged without load. Next, the transmission capability of the fluid coupling HK is reduced by draining or partially draining the working chamber FL. The brake B therefore now supports the transferred torque. The torque of the internal combustion engine VM is multiplied as a result. As the hydrodynamic transfer torque diminishes, the torque of the internal combustion engine VM is simultaneously reduced in order to hold the transmission input torque at the first sub-transmission TG1 constant.

A power shift can be implemented between the two input clutches K1, K2, i.e., a shift from the first gear G1 into the second gear 02, without terminating the start-up procedure by engaging the brake B. Time is therefore saved when revving up the vehicle, although comfort may be compromised.

While one gear of the second sub-transmission TG2 is active, the disengaged brake B can be synchronized as follows. Initially, the second clutch K2 is engaged and a gear is engaged in the second sub-transmission TG2. The first sub-transmission TG1 is shifted into neutral, the first clutch K1 is disengaged and the fluid coupling HK is drained, i.e., without any torque except for a slight drag torque, which may cause the sun gear SR to rotate slightly. Next, a gear is engaged in the first sub-transmission TG1. The gear must have a suitably slow gear ratio in order to ensure that the planet carrier PT rotates sufficiently slower than the drive shaft AN_VM of the internal combustion engine VM. This is necessary so that the sun gear SR can subsequently reach the speed of rotation of zero. The first clutch K1 is then actuated slightly in the engagement direction in order to transfer a small amount of torque that is sufficient to accelerate the ring gear HR. The sun gear SR slows as a result and reaches the speed of rotation of zero or approximately zero, at which point the brake B is engaged. Finally, the first clutch K1 is disengaged once more, in order to terminate the synchronization of the brake element B.

The second sub-transmission TG2 makes it possible to operate the vehicle with the start-up retarder AR decoupled, in order to avoid drag losses. To this end, the first clutch K1 and the brake B can be disengaged, the sun gear SR then rotates freely along therewith, and the fluid coupling HK therefore does not produce any drag losses. The start-up retarder AR can be fully decoupled by shifting the first sub-transmission TG1 into neutral and disengaging the first clutch K1. The shift element of the brake B can remain engaged, thereby eliminating the need for the resynchronization thereof.

When the brake B is engaged, the start-up retarder AR functions as a retarder, i.e., an auxiliary brake. A braking procedure can be implemented by braking the input shaft GE1 of the first sub-transmission TG1 with the fluid coupling HK filled, wherein a gear is engaged in the sub-transmission TG1. If a gear is not engaged in the first sub-transmission TG1 and a gear is engaged in the second sub-transmission TG2, braking action can be implemented by means of the engaged double clutch DK, i.e., with the first clutch K1 engaged and the second clutch K2 engaged.

Figure 2:
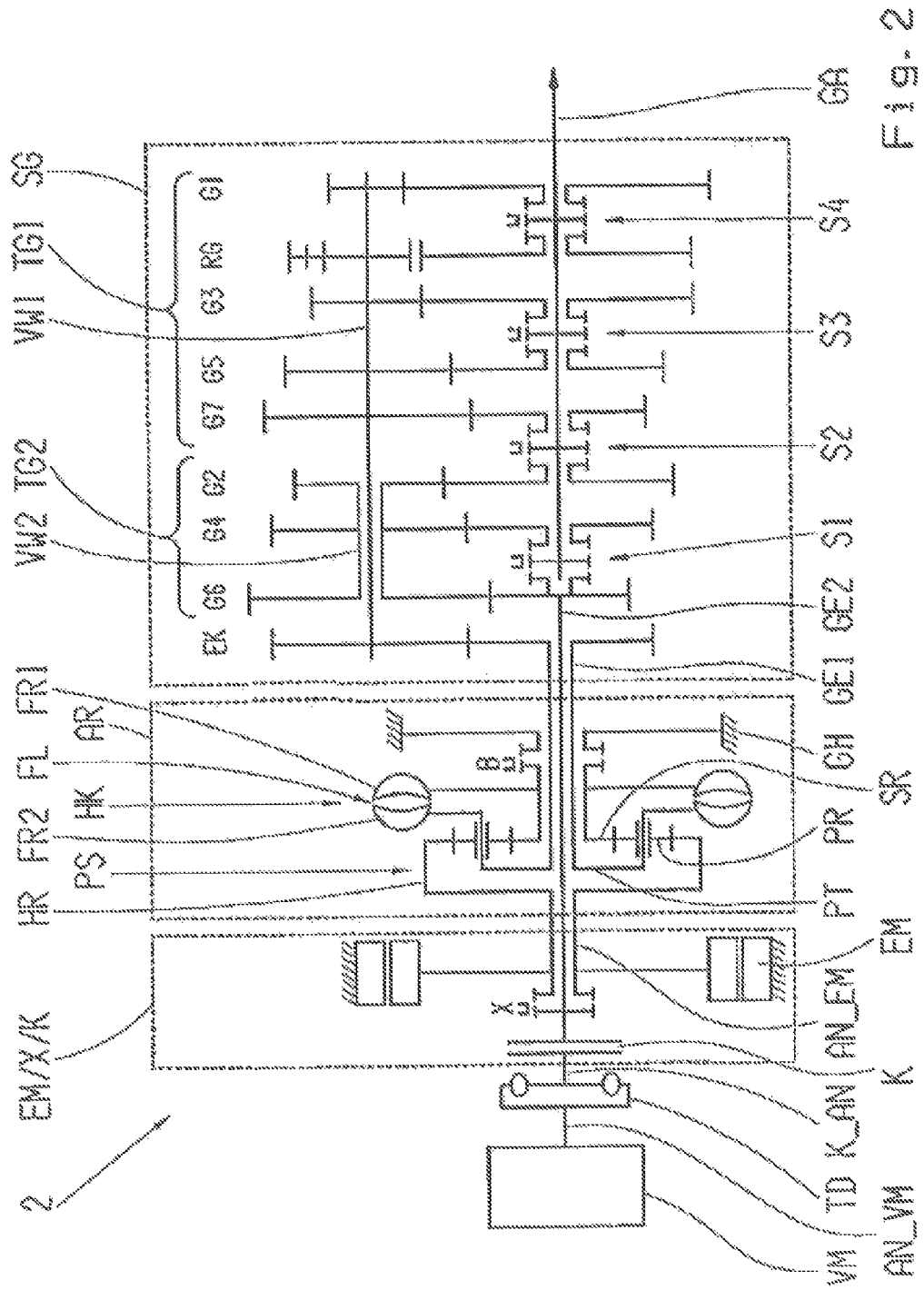
FIG. 2 shows a drive device for a vehicle comprising a hybrid transmission and a start-up retarder according to FIG. 1, and comprising a clutch disposed upstream of the start-up retarder relative to the drive train, and comprising an electric machine disposed upstream of the start-up retarder relative to the drive train.

FIG. 2 shows a drive device for a vehicle comprising a hybrid transmission 2 having the capability to provide electric tractive-force support, and having the start-up retarder AR. A hybrid module EX/X/K is provided instead of the double clutch module DK. The hybrid module EX/X/K comprises an electric machine EM, a clutch K (also referred to as a hybrid clutch), and a coupling shift element X. A drive shaft AN_EM of the electric machine EM, which is connected to the rotor of the electric machine EM, is connected to the input element, i.e., to the ring gear HR of the planetary gear set PS, in a rotationally fixed manner. The clutch K is disposed between the electric machine EM and the internal combustion engine VM. By means of the clutch K, a friction-locking connection can be established between the drive shaft AN_VM of the internal combustion engine VM and the second transmission input shaft GE2, which is assigned to the second sub-transmission TG2. The coupling shift element X is disposed between the clutch K and the electric machine EM. The coupling shift element X makes it possible to establish a shiftable, direct connection between the two transmission input elements GE1, GE2. The hybrid drive is structurally identical to the drive depicted in FIG. 1 in terms of the start-up retarder AR and the manual transmission SG comprising the two sub-transmissions TG1, TG2.

The hybrid transmission 2 comprising the start-up retarder AR has the following properties:

When the internal combustion engine VM is shut off, a hydrodynamic start-up procedure can be implemented in a driving mode relying on the electric motor via the start-up retarder AR by means of the electric machine EM. If the shift element of the brake B is engaged, a start-up procedure driven by the electric motor can be implemented mechanically from the beginning by virtue of the fact that the planetary gear set PS functions as a constant start-up gear ratio. Since the coupling shift element X is disengaged, the clutch K is disengaged and does not produce drag losses.

In addition, start-up can be implemented without delay proceeding from a generator mode of the electric machine EM. In order to ensure such start-up readiness, the clutch K and the coupling shift element X are engaged, the second sub-transmission TG2 is shifted into neutral, and a start-up gear is engaged in the first sub-transmission TG1. The brake element B is disengaged. The electric machine EM rotates at the speed of rotation of the internal combustion engine VM and functions as a generator, In order to start up, the working chamber FL is filled in order to generate a hydrodynamic torque at the fluid coupling HK. In the generator mode, it is possible to operate the vehicle in a creep mode. To this end, the above-described start-up procedure is continued for an arbitrarily long period of time at a low driving speed.

The shut-off internal combustion engine VM can be started while retaining the tractive force in the drive train and with slip decoupling. To this end, the vehicle is initially in a driving mode relying exclusively on the electric motor. The brake B is engaged, a gear is engaged in the first sub-transmission TG1, and the clutch K is disengaged. The coupling shift element X is engaged. A load therefore builds up at the fluid coupling HK as previously described, and therefore the brake B becomes load-free and can be disengaged. Since the output torque diminishes due to the reduction in torque multiplication by means of the planetary gear set PS, it is possible to increase the drive torque of the electric machine EM in a corresponding manner, to the extent this is available, as compensation therefor. The internal combustion engine VM is started by means of the clutch K. The fluid coupling HK dampens any fluctuations in the transfer of the starting torque. Next, the brake B can be synchronized under load by means of a suitable regulation of the torques of the internal combustion engine VM, the electric machine EM and, possibly, the fluid coupling HK. Finally, load is reduced at the fluid coupling HK, wherein the torques of the internal combustion engine VM and the electric machine EM are simultaneously adjusted in order to obtain a desired course of torque at the output drive.

The electric machine EM can support power shifts. To this end, the electric machine EM supports the output torque by means of the first sub-transmission TG1, while a gear shift is implemented in a manner driven by the internal combustion engine. The gear shift can be implemented in the second sub-transmission TG2. As an alternative thereto, the internal combustion engine can be coupled to the first sub-transmission TG1 by means of the coupling shift element X and the gear shift can be implemented at the first sub-transmission. The necessary synchronization of these shifts can take place via synchronizations at the coupling shift element X and/or at the shifting groups S1, S2 of the second sub-transmission TG2, provided these are available. If a gear shift driven by the electric motor is implemented in the first sub-transmission TG1, the respectively applicable shift elements S2, S3, S4 of the first sub-transmission TG1 are synchronized by means of the electric machine EM. Reference is made, in addition, to the above-mentioned document DE 10 2010 030 569 A1, which belongs to the applicant.

Power shifts can be implemented in a driving mode relying exclusively on the electric motor with the aid of the fluid coupling HK. In the case of a traction upshift in a driving mode by means of the second sub-transmission TG2, which is implemented by engaging the coupling shift element X with the clutch K disengaged and the brake B disengaged, a subsequent gear can be engaged in the first sub-transmission TG1. Next, the fluid coupling HK assumes the load and, therefore, the second sub-transmission TG2 becomes load-free and the gear of the second sub-transmission TG2 can be disengaged. The brake B can then be synchronized and engaged. During the traction upshift, it is basically possible to start the internal combustion engine VM with the use of the released rotational energy of the electric machine EM. A traction downshift is also possible. Reference is made, in addition, to the above-mentioned document DE 10 2010 030 569 A1, which belongs to the applicant, and to the above-mentioned document DE 10 2010 061 827 A1.

Figure 3:
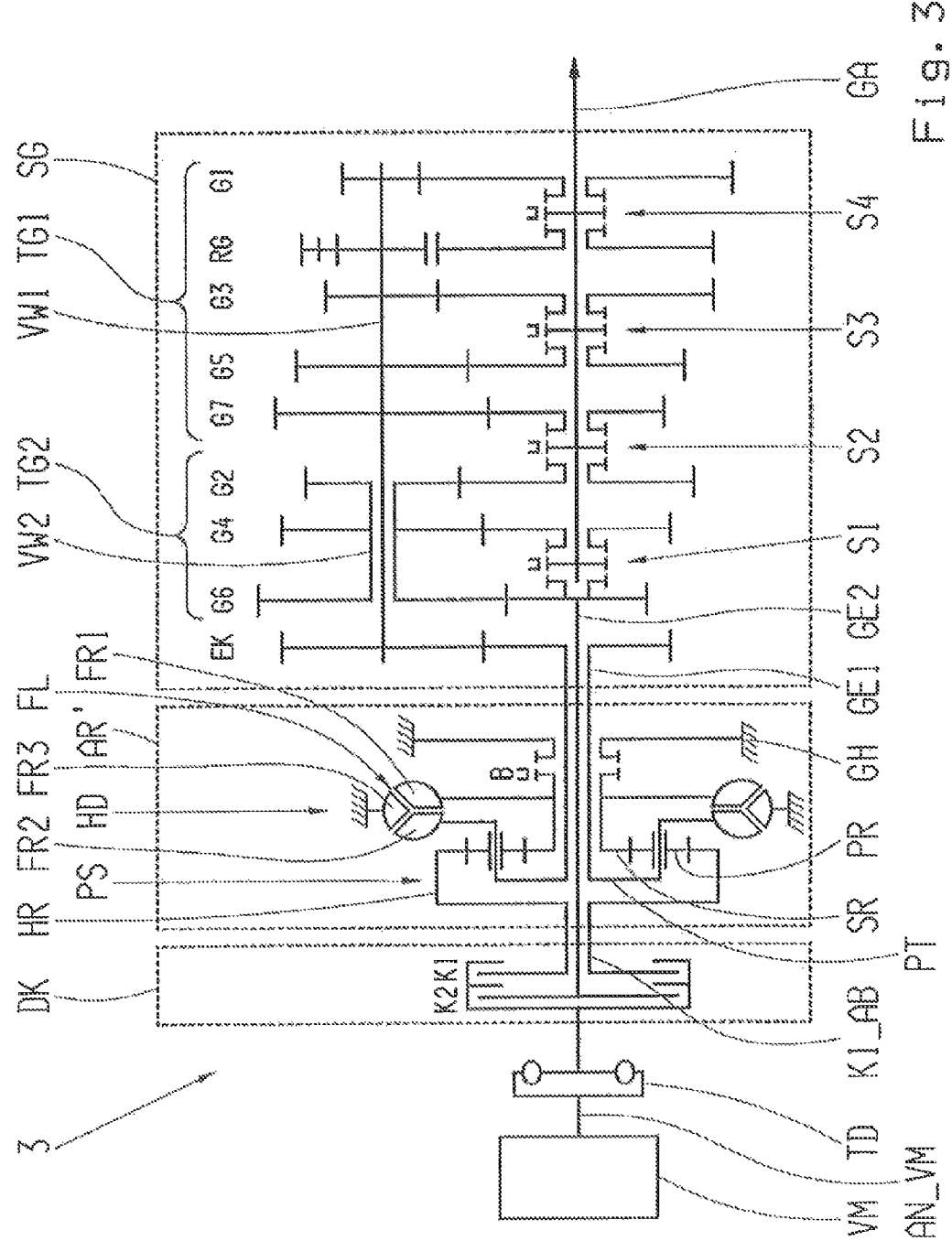
FIG. 3 shows a drive device according to FIG. 1, but comprising a start-up retarder having a torque converter.
Figure 4:
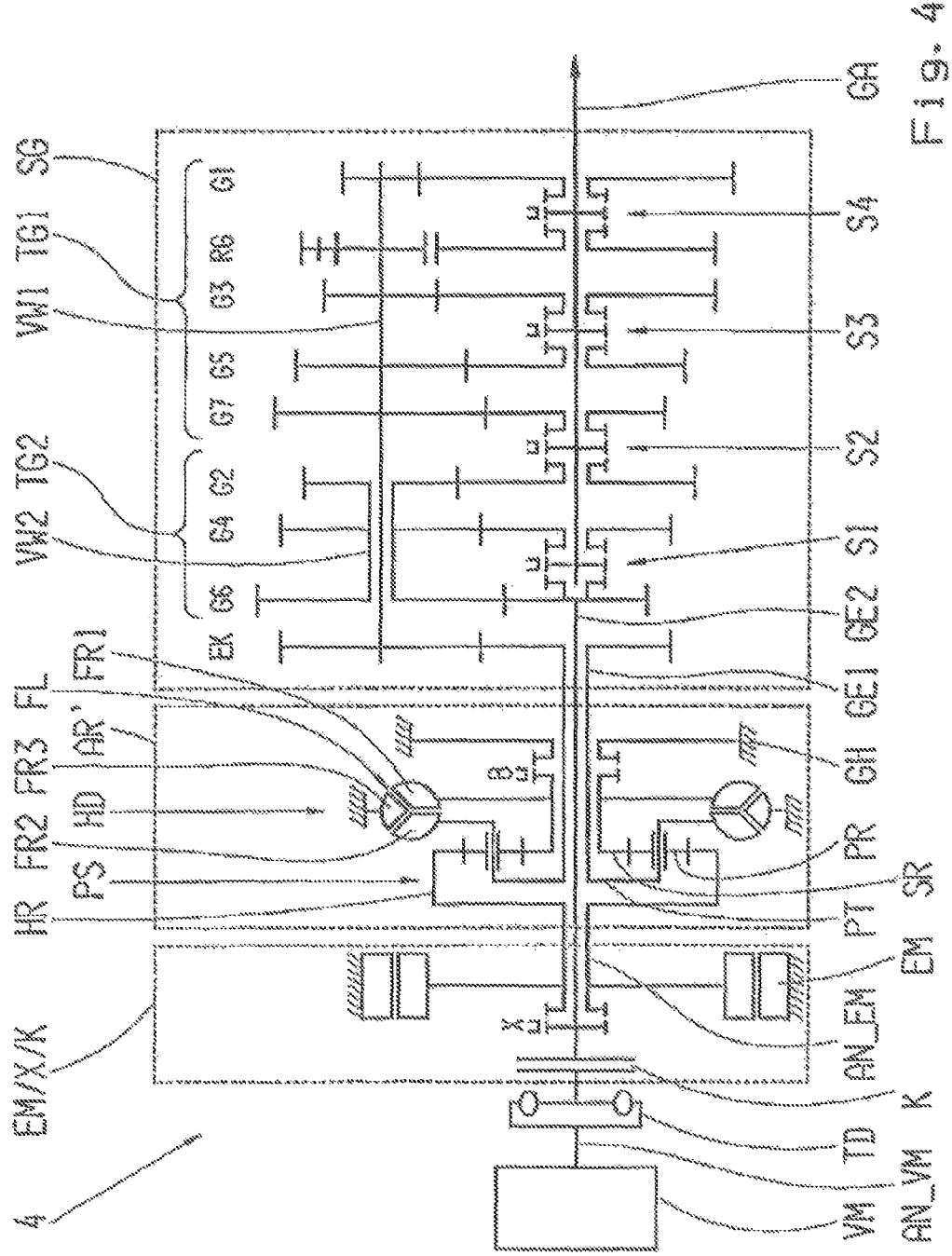
FIG. 4 shows a drive device for a vehicle comprising a hybrid transmission according to FIG, 2, but comprising a start-up retarder according to FIG. 3.

FIG. 3 shows a double clutch transmission 3, which is comparable to the double clutch transmission 1 depicted in FIG. 1 and comprises a start-up retarder AR'. In this case, a hydrodynamic torque converter HD is provided instead of the fluid coupling HK. The hydrodynamic torque converter additionally comprises a third, fixed functional wheel FR3, which, as a stator, induces a hydrodynamic torque multiplication of the drive torque, FIG. 4 shows a hybrid drive 4 comprising such a torque converter HD. The mode of operation is similar to the functions described with respect to FIG. 1 and FIG. 2. However, there is no need to adjust the torque of the internal combustion engine VM or the electric machine EM in the event of a load transfer from the hydrodynamic transfer element HD to the brake B and vice versa.

Figure 5:
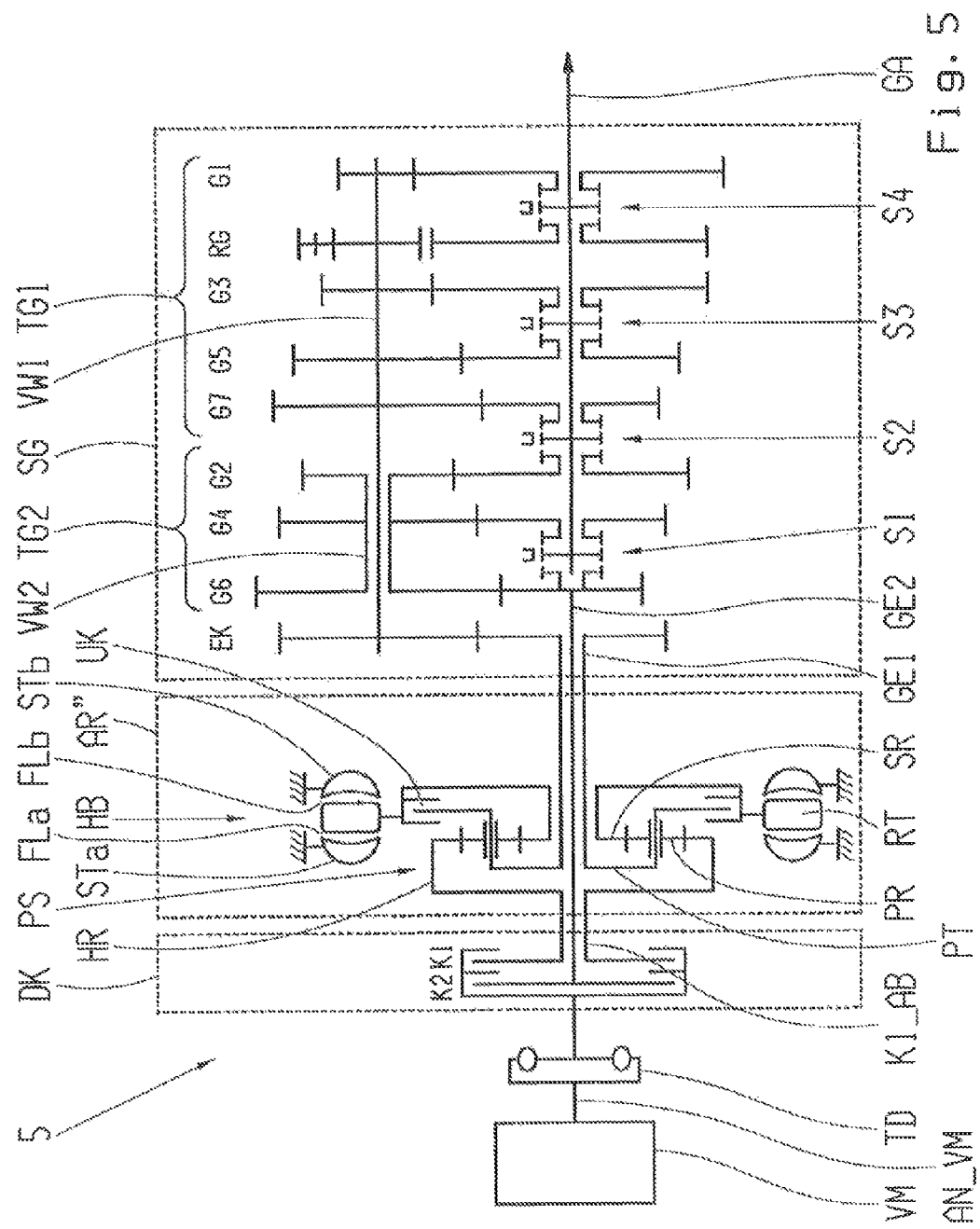
FIG. 5 shows a drive device for a vehicle, comprising a double clutch transmission according to FIG, 1, but comprising a start-up retarder having a double-flow fluid coupling.
Figure 6:
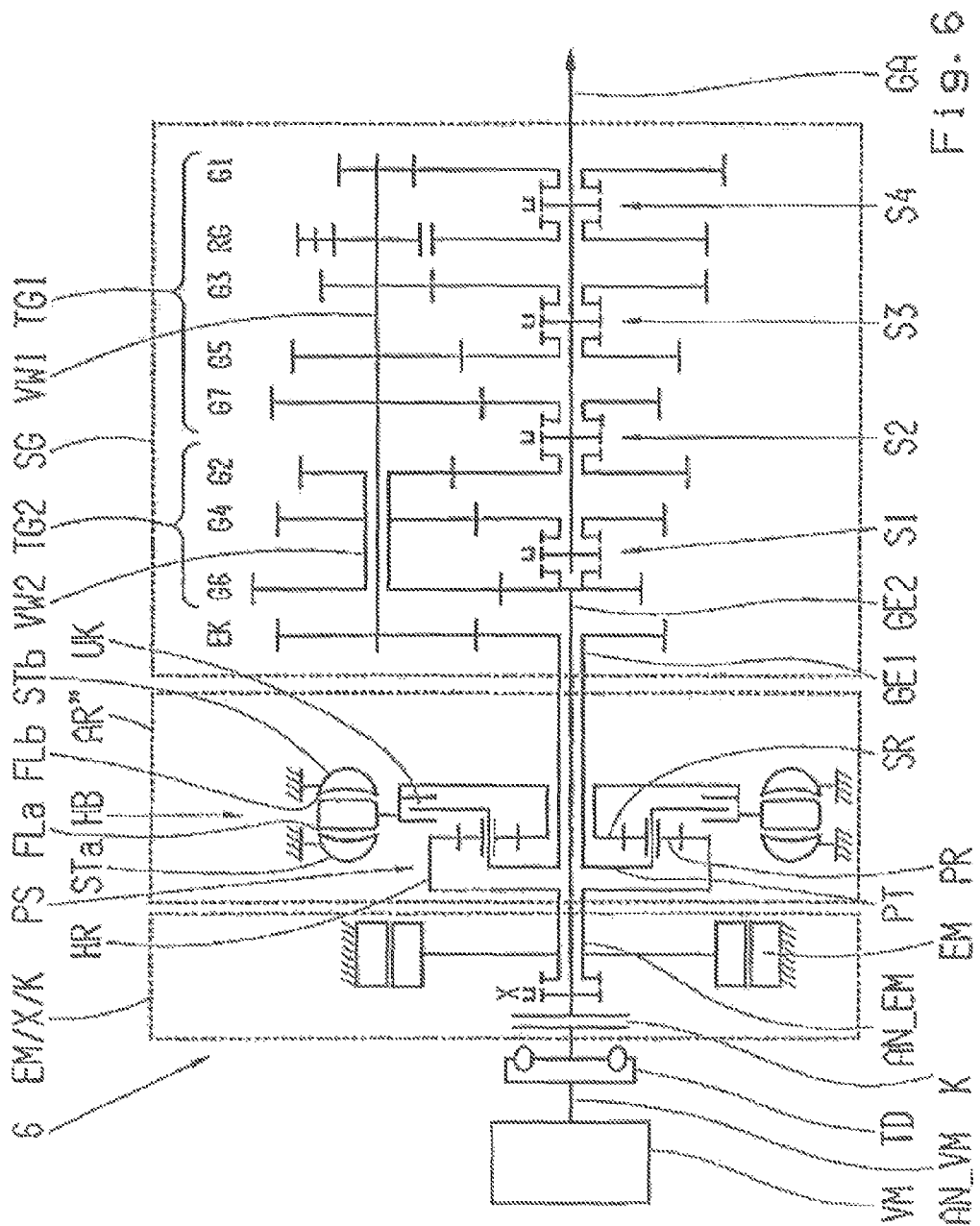
FIG. 6 shows a drive device for a vehicle comprising a hybrid transmission according to FIG. 2, but comprising a start-up retarder according to FIG. 5

FIG. 5 and FIG. 6 show a further double clutch transmission 5 and a further hybrid transmission 6, respectively. Both of these comprise a double-flow start-up retarder AR". The design and the mode of operation of such a start-up retarder are known from the initially mentioned document DE 198 17 865 A1. The description is therefore limited here to the connection to the double clutch transmission 5 or to the hybrid transmission 6, respectively.

The double-flow start-up retarder AR" comprises a hydrodynamic transfer element HB having two first, fixed functional wheels STa, STb and a second, rotatable functional wheel RT. The two stators STa, STb are disposed axially opposite one another. The rotor RT is disposed therebetween. The stators STa, STb, with the rotor RT, form a working chamber FLa, FLb in each case, as well as a hydraulic circuit for both possible directions of rotation of the rotor RT. A planetary gear set PS is also provided, as is the case with the start-up retarders shown in FIG. 1 and FIG. 3. A lock-up clutch UK is also provided. The brake B is therefore omitted.

In the double clutch transmission 5 depicted in FIG. 5, the ring gear HR of the planetary gear set PS is connected to the output shaft K1_AB of the first clutch K1. The sun gear SR is connected to the rotor RT of the hydrodynamic transfer element HB. The planet carrier PT is connected on the output side to the first transmission input shaft GE1. The sun gear SR can be coupled to the planet carrier PT by means of the lock-up clutch UK.

In the case of the double clutch transmission 5, a hydrodynamic start-up function can be used when the lock-up clutch UK is disengaged and a hydrodynamic retarder function can be implemented when the lock-up clutch UK is engaged.

In a start-up procedure, when the working chamber FLa or FLb is filled, the sun gear SR is increasingly braked and a transmission input torque is correspondingly built up at the first transmission input shaft GE1. Torque multiplication takes place since the second functional wheel (rotor RT) is fixed. The sun gear SR can be hydrodynamically braked nearly to a standstill. The start-up procedure can be completely terminated by engaging the lock-up clutch UK, whereupon the planetary gear set PS transitions into direct drive. When the retarder HB is drained, the retarder setting engaged by means of the lock-up clutch UK is inactive.

In order to permit use as a retarder, the sun gear SR is coupled to the planet carrier PT by means of the lock-up clutch UK and the hydrodynamic transfer element HB is filled. The direction of rotation between the stators STa and STb and the rotor RT reverses. The desired braking effect is then achieved by means of the other working chamber FLa or FLb or the other hydraulic circuit.

In this arrangement as well, a power shift can be implemented between the two clutches K1, K2 without terminating the start-up procedure, in this case by engaging the lock-up clutch UK. In order to implement such a power shift before the start-up procedure is concluded, the gear increment between a first gear G1 and a second gear G2 in the transmission structure is preferably designed to be rather small. Since the lock-up clutch UK does not necessarily have to terminate the start-up procedure, this lock-up clutch UK can be designed relatively weaker.

After the power shift, the lock-up clutch UK can be engaged without load, with a gear engaged in the first sub-transmission TG1. The lock-up clutch could then be engaged in the manner of a synchronized shifting clutch, or could be similarly designed.

It is also possible to synchronize the lock-up clutch UK, with a gear engaged in the first sub-transmission TG1, by means of a slip mode of the first clutch K1. The lock-up clutch UK could then be engaged in the manner of a simple shift dog, or could be similarly designed.

In the hybrid transmission 6 depicted in FIG. 6, the ring gear HR is connected to the drive shaft AN_EM of the electric machine EM, the sun gear SR is connected to the second functional wheel of the hydrodynamic transfer element HB, i.e., to the rotor RT, and the planet carrier PT is connected on the output side to the first transmission input shaft GE1. The sun gear SR, which is connected to the rotor RT, can be coupled to the planet carrier PT by means of the lock-up clutch UK, thereby enabling the use of a hydrodynamic start-up function when the lock-up clutch UK is disengaged and enabling the use of a hydrodynamic retarder function when the lock-up clutch UK is engaged.

The hybrid transmission 6 permits a hydrodynamic start-up to be implemented in a driving mode relying exclusively on the electric motor. A mechanical start-up procedure is also possible, wherein, in this case, the lock-up clutch UK is engaged instead of the brake B, which is omitted. The clutch K of the second sub-transmission TG2 can be disengaged in order to avoid drag losses. Start-up can be implemented without delay proceeding from a generator mode. A creep mode can be utilized in a generator mode. The internal combustion engine VM can be started while retaining tractive force and with slip decoupling, Power shifts can be implemented with support by the electric motor and power shifts can be implemented in a driving mode relying exclusively on the electric motor with the aid of the lock-up clutch UK.

Figure 7:
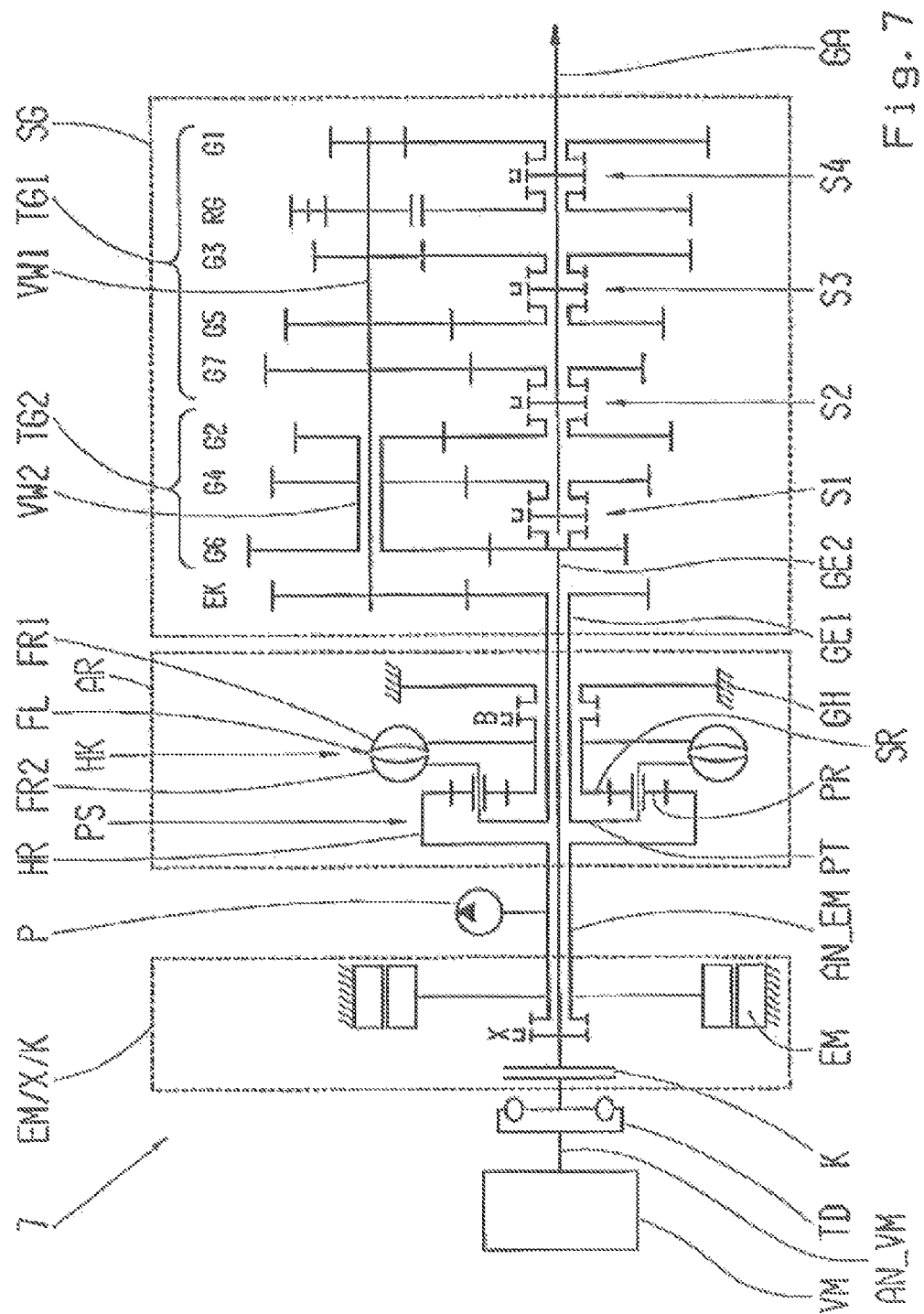
FIG. 7 shows a drive device for a vehicle, comprising a hybrid transmission according to FIG. 2, additionally comprising a hydraulic fluid pump.

FIG. 7 shows a hybrid transmission 7, which is largely structurally identical to the hybrid transmission shown in FIG. 2. The only difference is that a hydraulic fluid pump P is additionally disposed at the drive shaft AN_EM of the electric machine EM and can be driven by the drive shaft. The hydraulic fluid pump P can also be operated when the vehicle is at a standstill. A separately drivable pump can possibly be omitted.

Figure 8:
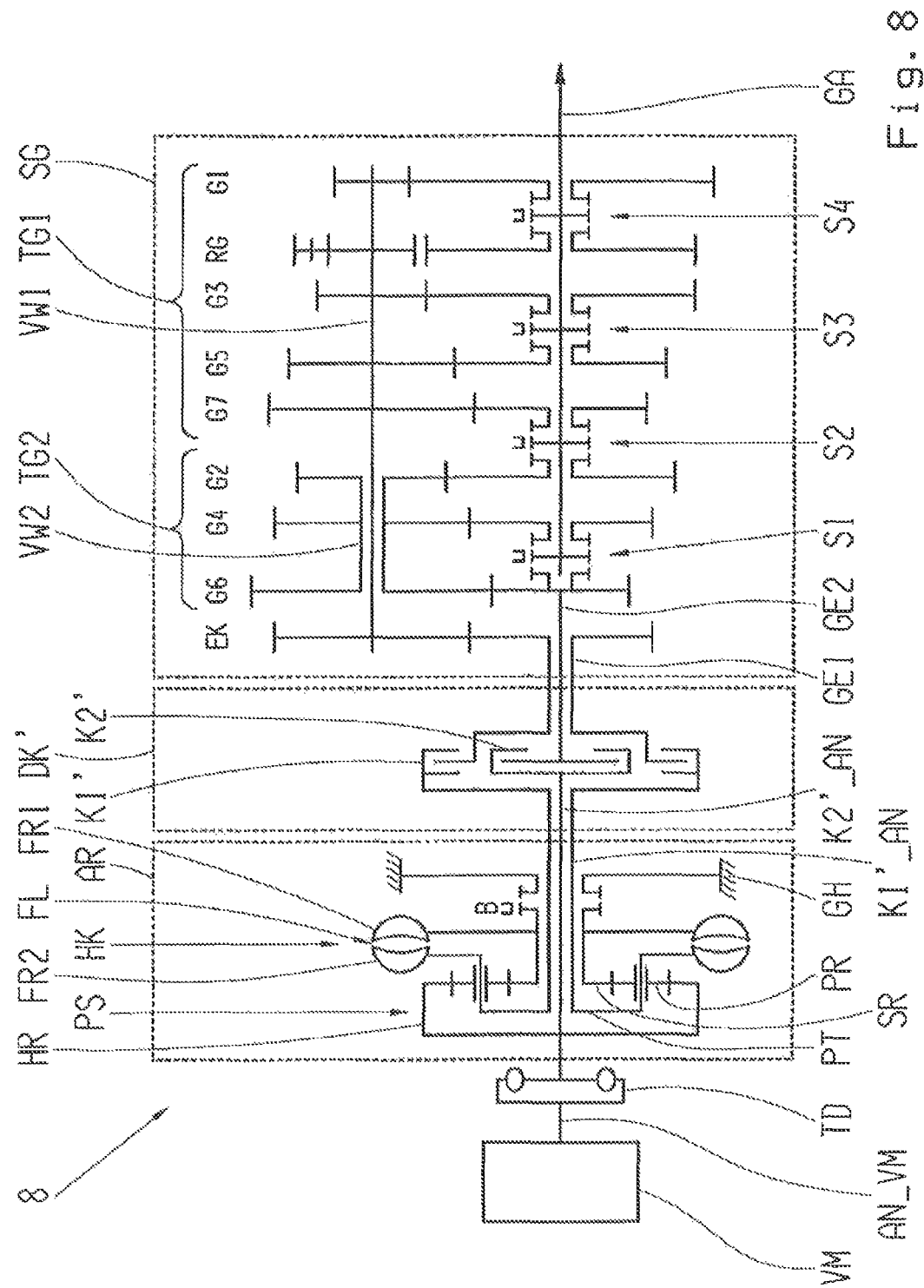
FIG. 8 shows a drive device for a vehicle, comprising a double clutch transmission according to FIG. 1, but comprising two single clutches disposed downstream of the start-up retarder relative to the drive train.

In the example embodiments shown so far, the double clutch module is disposed upstream of the start-up retarder AR, AR', AR". FIG. 8 shows, lastly, a further drive device comprising a double clutch transmission 8, in which, alternatively, two single clutches K1', K2' are disposed between the start-up retarder AR and the manual transmission SG. In this double clutch transmission 8, comprising a start-up retarder and a double clutch DK disposed downstream of the start-up retarder AR relative to the drive train, the sun gear SR of the planetary gear set PS is connected to the first functional wheel FR1 of the hydrodynamic transfer element HK and can be fixed on the rotationally fixed component GH by means of the shift element B. The ring gear HR is drivingly connected to the internal combustion engine VM and is connected to a clutch input shaft K2'_AN of the second clutch K2'. The planet carrier PT is connected on the drive side to the second functional wheel FR2 in a rotationally fixed manner and is connected on the output side to a clutch input shaft K1'_AN of the first clutch K1'. The mode of operation is the same as for the double clutch transmission 1 shown in FIG. 1.

LIST OF REFERENCE CHARACTERS 1 double clutch transmission
2 hybrid transmission
3 double clutch transmission
4 hybrid transmission
5 double clutch transmission
6 hybrid transmission
7 hybrid transmission
8 double clutch transmission
AR, AR', AR" start-up element, start-up retarder
AN_EM drive shaft of the electric machine
AN_VM drive shaft of the internal combustion engine
B shift element, brake
DK, DK' double clutch
EK input constant
EM electric machine
EX/X/K hybrid module
FL hydrodynamic working chamber, hydraulic circuit
FLa hydrodynamic working chamber, hydraulic circuit
FLb hydrodynamic working chamber, hydraulic circuit
FR1 first functional wheel
FR2 second functional wheel
FR3 third functional wheel
G1 first gear
G2 second gear
G3 third gear
G4 fourth gear
G5 fifth gear
G6 sixth gear
G7 seventh gear
GA transmission output shaft
GE1 first transmission input shaft
GE2 second transmission input shaft
HB hydrodynamic transfer element, retarder
HD hydrodynamic transfer element, torque converter
HK hydrodynamic transfer element, fluid coupling
HR ring gear
K_AN common clutch input shaft
K1, K1' first clutch
K2, K2' second clutch
K clutch
K1_AB clutch output shaft
K1'_AN clutch input shaft
K2'_AN clutch input shaft
P hydraulic fluid pump
PR planetary gear
PS planetary gear set
PT planet carrier
RG reverse gear
RT rotor
S1 shifting group
S2 shifting group
S2 shifting group
S4 shifting group
SG manual transmission
STa stator
STb stator
SR sun gear
TD vibration damper
TG1 first sub-transmission
TG2 second sub-transmission
UK lock-up clutch
VM internal combustion engine
VW1 first countershaft
VW2 second countershaft
X coupling shift element

The invention claimed is:

1. A drive device for a vehicle comprising:
an internal combustion engine (VM);
a multistage manual transmission (SG) having first and second sub-transmissions (TG1, TG2), the first sub-transmission having a first transmission input shaft (GE1), and the second sub-transmission having a second transmission input shaft (GE2);
the first transmission input shaft (GE1) of the first sub-transmission (TG1) being connected to either a first clutch (K1, K1') or a coupling shift element (X), associated with an electric machine (EM), for drivingly coupling the first transmission input shaft (GE1) to the internal combustion engine (VM);
the second transmission input shaft (GE2) of the second sub-transmission (TG2) being connected to either a second clutch (K2) or a hybrid clutch (K), for drivingly coupling the second transmission input shaft (GE2) to the internal combustion engine (VM);
the first transmission input shaft (GE1) being drivingly connected to a start-up element (AR, AR', AR") which comprises at least one hydrodynamic transfer element (HK, HD, HB) and a planetary gear set (PS) coupled to one another so as to form a single unit;
the at least one hydrodynamic transfer element has a first functional wheel (FR1, STa, STb) and a second functional wheel (FR2, RT), the first and the second functional wheels together form a working chamber (FL, FLa, FLb), which fills with fluid to generate a hydrodynamic transfer torque to implement at least one start-up function, affecting only the first sub-transmission (TG1);
the first and the second sub-transmissions (TG1, TG2) form an auxiliary transmission;

the first and the second transmission input shafts (GE1, GE2) are disposed coaxially relative to one another;

a common transmission output shaft (GA) is disposed coaxially downstream of the first and the second transmission input shafts (GE1, GE2);

the first transmission input shaft (GE1) is assigned to the first sub-transmission (TG1) and is embodied as an outer hollow shaft;

the second transmission input shaft (GE2) is assigned to the second sub-transmission (TG2) and is disposed in and extends out of the first transmission shaft on a transmission side;

the first and the second sub-transmissions (TG1, TG2) are each assigned one of two countershafts (VW1, VW2), which are disposed coaxially over one another and which are drivingly connected to the respective transmission input shaft (GE1, GE2) by one gear plane (EK, G6) having two enmeshed gearwheels;

the first and the second sub-transmissions (TG1, TG2) comprise further gear planes (G1, G2, G3, G4, G5, G7, RG);

in each of the further gear planes (G1, G2, G3, G4, G5, G7, RG) enmeshed gearwheels are disposed, the gearwheels being either idler gears or fixed gears;

each of the gearwheels being either connected to one of the output, the input and the countershafts (GE1, GE2, GA, VW1, VW2) in a rotationally fixed manner or being connectable in a rotationally fixed manner by shifting devices (S1, S2, S3, S4) to one of the output, the input and the countershafts (GE1, GE2, GA, VW1, VW2);

a group of gears having odd gears (G1, G3, G5, G7), with at least one start-up gear and at least one reverse gear (RG), is assigned to the first sub-transmission (TG1); and at least one group of gears having even gears (G2, G4, G6) is assigned to the second sub-transmission (TG2).

2. The drive device according to claim 1, wherein the start-up element (AR) is a start-up retarder and comprises:

the at least one hydrodynamic transfer element (HK) having the first rotatable functional wheel (FR1) and the second rotatable functional wheel (FR2);

the planetary gear set (PS) with a ring gear (HR), a sun gear (SR) and a planet carrier (PT), and the planet carrier (PT) rotatably supports a plurality of planet gears (PR) which mesh with the sun gear (SR) and the ring gear (HR); and a shift element (B) which fixes one of the first and the second rotatable functional wheels (FR1, FR2).

3. The drive device according to claim 1, wherein the first and the second sub-transmissions (TG1, TG2) form a double clutch transmission (1) which includes the first and the second clutches (K1, K2), the first clutch (K1) is assigned to the first sub-transmission (TG1) and the second clutch (K2) is assigned to the second sub-transmission (TG2);

the first and the second clutches (K1, K2) form a double clutch (DK) and are disposed upstream of the start-up element (AR) relative to a drive train;

the first and the second clutches (K1, K2) are drivingly connected, on an input side thereof, to the internal combustion engine (VM);

an output side of the first clutch (K1) is connected, in a rotationally fixed manner, to an input element (HR) of the planetary gear set (PS) by a first clutch output shaft (K1_AB); and an output side of the second clutch (K2) is connected, in a rotationally fixed manner, to the second transmission input shaft (GE2).

4. The drive device according to claim 2, wherein the first and the second sub-transmissions form a double clutch transmission (1) which comprise the start-up retarder (AR) and a double clutch (DK);

the double clutch is disposed upstream of the start-up retarder (AR);

one of the ring gear (HR) or the sun gear (SR) of the planetary gear set is connected, in a rotationally fixed manner, to the first functional wheel (FR1) of the at least one hydrodynamic transfer element (HK) and is fixable, by the shift element (B), to a stationary component (GH);

the other of the ring gear (HR) and the sun gear (SR) is connected, in a rotationally fixed manner, to an output shaft (K1_AB) of the first clutch (K1), and the planet carrier (PT) is connected, in a rotationally fixed manner, on a drive side thereof to the second functional wheel (FR2); and the planet carrier (PT) is connected, in a rotationally fixed manner, on an output side thereof to the first transmission input shaft (GE1) such that a hydrodynamic start-up function is implemented when the shift element (B) is disengaged and the first clutch (K1) is engaged, and a hydrodynamic retarder function is implemented when the shift element (B) is engaged.

5. The drive device according to claim 1, wherein the first and the second sub-transmissions (TG1, TG2) form a hybrid transmission (2) comprising the hybrid clutch (K) and the electric machine (EM);

the electric machine (EM) is assigned to the first sub-transmission (TG1) and is disposed upstream of the start-up element (AR) relative to a drive train;

the electric machine (EM) is connected, in a rotationally fixed manner, to an input element (HR) of the planetary gear set (PS) by a drive shaft (AN_EM) of the electric machine (EM);

the hybrid clutch (K) is assigned to the second sub-transmission (TG2) and is disposed upstream of the start-up element (AR) relative to the drive train;

the hybrid clutch (K) comprises a clutch input shaft (K_AN) on an input side thereof which is drivingly connected to the internal combustion engine (VM);

the hybrid clutch (K) is connected on an output side thereof to the second transmission input shaft (GE2) in a rotationally fixed manner; and the coupling shift element (X) is provided, by which the first and the second transmission input shafts (GE1, GE2) are couplable to one another.

6. The drive device according to claim 1, wherein, the first and the second sub-transmissions (TG1, TG2) form a hybrid transmission (2) comprising the start-up element (AR), which is a start-up retarder (AR), the hybrid clutch (K), and the electric machine (EM);

the hybrid clutch (K) and the electric machine (EM) are disposed upstream of the start-up retarder (AR) relative to a drive train;

one of a ring gear (HR) or a sun gear (SR) of the planetary gear set is connected, in a rotationally fixed manner, to the first functional wheel (FR1) of the at least one hydrodynamic transfer element (HK) and is fixable by a shift element (B) to a stationary component (GH);

another of the ring gear (HR) or the sun gear (SR) of the planetary gear set is connected, in a rotationally fixed manner, to a drive shaft (AN_EM) of the electric machine (EM); and a planet carrier (PT) is connected, in a rotationally fixed manner, on a drive side to the second functional wheel (FR2) and is connected, in a rotationally fixed manner, on an output side to the first transmission input shaft (GE1) such that a hydrodynamic start-up function is implemented when the shift element (B) is disengaged, and a hydrodynamic retarder function is implemented when the shift element (B) is engaged.

7. The drive device according to claim 1, wherein the first and second sub-transmissions form a hybrid transmission, in which the electric machine (EM) is provided;

the electric machine (EM) is assigned to the first sub-transmission (TG1) and is disposed upstream of the start-up element (AR) relative to a drive train;

the electric machine (EM) is connected, in a rotationally fixed manner, to an input element (HR) of the planetary gear set (PS) by a drive shaft (AN_EM) of the electric machine (EM);

the second transmission input shaft (GE2) assigned to the second sub-transmission (TG2) and is drivingly connected to the internal combustion engine (VM); and the coupling shift element (X) is provided along the second transmission input shaft (GE2) by which the first and the second transmission input shafts (GE1, GE2) are couplable.

8. The drive device according to claim 1, wherein the first and the second sub-transmissions (TG1, TG2) form a hybrid transmission (7) comprising the start-up element (AR), which is a start-up retarder (AR), and the electric machine (EM); and a hydraulic fluid pump (P) is connected to a drive shaft (AN_EM) of the electric machine (EM) and is disposed between the electric machine (EM) and the start-up retarder (AR).

9. The drive device according to claim 1, wherein the at least one hydrodynamic transfer element (HD) comprises a third functional wheel (FR3) which is fixedly disposed between the first functional wheel (FR1) and the second functional wheel (FR2) such that the at least one hydrodynamic transfer element (HD) forms a hydrodynamic torque converter.

10. The drive device for a vehicle according to claim 1, wherein the start-up element (AR") is a double-flow start-up retarder which comprises the at least one hydrodynamic transfer element (HB) with two fixed functional wheels (STa, STb) and one rotatable functional wheel (RT), which form two working chambers (FLa, FLb) having two hydraulic circuits;

one of the two hydraulic circuits is effective in one direction of rotation of the rotatable functional wheel (RT); and the planetary gear set (PS) has a ring gear (HR), a sun gear (SR), and a planet carrier (PT), and the planet carrier (PT) supports a plurality of planetary gears (PR) which mesh with both the sun gear (SR) and the ring gear (HR), and a lock-up clutch (UK).

11. The drive device according to claim 1, wherein the first and the second sub-transmissions (TG1, TG2) form a double clutch transmission (5) having the start-up element (AR), which is a double-flow start-up retarder (AR"), and a double clutch (DK) disposed upstream of the double-flow start-up retarder (AR") relative to a drive train;

one of a ring gear (HR) or a sun gear (SR) of the planetary gear set is connected, in a rotationally fixed manner, to an output shaft ($K1_{13}$ AB) of the first clutch (K1);

another of the ring gear (HR) or the sun gear (SR) of the planetary gear set is connected, in a rotationally fixed manner, to the second functional wheel (RT;

a planet carrier (PT) is connected, in a rotationally fixed manner, on an output side to the first transmission input shaft (GE1); and the one of the ring gear (HR) or the sun gear (SR) of the planetary gear set, that is connected in a rotationally fixed manner to the second functional wheel (RT), is connectable in a rotationally fixed manner to the planet carrier (PT) by a lock-up clutch (UK) such that a hydrodynamic start-up function can be implemented when the lock-up clutch (UK) is disengaged and a hydrodynamic retarder function can be implemented when the lock-up clutch (UK) is engaged.

12. The drive device according to claim 1, wherein the first and the second sub-transmissions (TG1, TG2) form a hybrid transmission (7) comprising the start-up element (AR), which is a double-flow start-up retarder (AR"), the hybrid clutch (K) and the electric machine (EM);

the hybrid clutch (K) and the electric machine (EM) are disposed upstream of the start-up retarder (AR") relative to a drive train;

one of a ring gear (HR) or a sun gear (SR) of the planetary gear set, is connected to a drive shaft (AN_EM) of the electric machine (EM) in a rotationally fixed manner;

another of the ring gear (HR) or the sun gear (SR) of the planetary gear set is connected, in a rotationally fixed manner, to the second functional wheel (RT);

a planet carrier (PT) is connected, in a rotationally fixed manner, on an output side to the first transmission input shaft (GE1); and the one of the ring gear (HR) or the sun gear (SR), that is connected in a rotationally fixed manner to the second functional wheel (RT), is connectable, in a rotationally fixed manner, to the planet carrier (PT) by a lock-up clutch (UK) such that a hydrodynamic start-up function can be implemented when the lock-up clutch (UK) is disengaged and a hydrodynamic retarder function can be implemented when the lock-up clutch (UK) is engaged.

13. The drive device according to claim 1, wherein the first and the second sub-transmissions (TG1, TG2) form a double clutch transmission (8) with the first and the second clutches (K1', K2');

one of the first and the second clutches (K1', K2') is assigned to each one of the first and second sub-transmissions (TG1, TG2);

the first and the second clutches (K1', K2') are separate first and second single clutches and are disposed downstream of the start-up element (AR) relative to a drive train and each comprise a separate first and second clutch input shaft (K1'_AN), K2'_AN) on an input side of the first and second clutches (K1', K2');

the first clutch (K1') is assigned to the first sub-transmission (TG1) and is connected on the input side, by the first clutch input shaft (K1'_AN), to an element (PT) of the planetary gear set (PS) and is connected, in a rotationally fixed manner, on an output side of the first clutch (K1') to the first transmission input shaft (GE1); and the second clutch (K2) is assigned to the second sub-transmission (TG2) and is drivingly connected on the input side, by the second clutch input shaft (K2'_AN)

thereof, to the internal combustion engine (VM) and is connected, in a rotationally fixed manner, on an output side of the second clutch (K2') to the second transmission input shaft (GE2).

14. The drive device according to claim 1, wherein the first and the second sub-transmissions (TG1, TG2) form part of a double clutch transmission (8);
   the double clutch transmission (8) comprise the start-up element (AR), which is a start-up retarder (AR), and a double clutch)(DK') disposed downstream of the start-up retarder (AR) relative to a drive train;
   one of a ring gear (HR) or a sun gear (SR) of the planetary gear set is connected, in a rotationally fixed manner, to the first functional wheel (FR1) of the hydrodynamic transfer element (HK) and is fixable to a stationary component (GH) by a shift element (B);
   another of the ring gear (HR) or the sun gear (SR) of the planetary gear set, is drivingly connected to the internal combustion engine (VM) and is connected, in a rotationally fixed manner, to a clutch input shaft (K2'_AN) of the second clutch (K2); and
   a planet carrier (PT) is connected, in a rotationally fixed manner, on a drive side to the second functional wheel (FR2) and is connected, in a rotationally fixed manner, on an output side to a clutch input shaft (K1'_AN) of the first clutch (K1) such that a hydrodynamic stark-up function is implemented when the shift element (B) is disengaged, and a hydrodynamic retarder function is implemented when the shift element (B) is engaged.

15. A method of operating a drive device for a vehicle, having an internal combustion engine (VM) and a transmission, designed as a multistage manual transmission (SG) having first and second sub-transmissions (TG1, TG2);
   the first sub-transmission having a first transmission input shaft (GE1);
   the second sub-transmission having a second transmission input shaft (GE2);
   the first transmission input shaft (GE1) of the first sub-transmission (TG1) is assigned a first clutch (K1, K1') by which the first transmission input shaft (GE1) is either drivingly connectable to the internal combustion engine (VM), or is assigned an electric machine (EM);
   the second transmission input shaft (GE2) of the second sub-transmission (TG2) is assigned a second clutch (K2) by which the second transmission input shaft (GE2) is drivingly connectable to the internal combustion engine (VM); and
   the method comprising the steps of:
   implementing at least one hydrodynamic start-up function by a start-up element (AR, AR', AR"), the start-up element (AR, AR', AR") being assigned to the first transmission input shaft (GE1) and comprising at least one hydrodynamic transfer element (HK, HD, HB) comprising a first functional wheel (FR1, STa, STb) and a second functional wheel (FR2, RT) which together form a working chamber (FL, FLa, FLb) for receiving fluid in order to generate a hydrodynamic transfer torque;
   wherein the at least one hydrodynamic transfer element (HK) and a planetary gear set (PS) are coupled to one another so as to form one unit;
   implementing the start-op function by the start-up element (AR) which is embodied as a start-up retarder, the start-up retarder (AR) comprises the at least one hydrodynamic transfer element (HK) having a first rotatable functional wheel (FR1) and second rotatable functional wheel (FR2), the planetary gear set (PS) has a ring gear (HR), a sun gear (SR), and a planet carrier (PT), which rotationally supports a plurality of planetary gears (PR) that mesh with the sun gear (SR) and the ring gear (HR), and a shift element (B),
   building a hydrodynamic transfer torque with the start up retarder by filling the working chamber (FL) with fluid, one of the ring gear (HR) or the sun gear (SR)of the planetary gear set functions as a drive element of the planetary gear set (PS), which is driven by a drive motor (VM, EM), the other of the ring gear (HR) or the sun gear (SR) of the planetary gear set, that is connected in a rotationally fixed manner to the first functional wheel (FR1) and is fixable to a rotationally fixed component by a shift element (B), is fixed via engagement of the shift element (B) when a speed of rotation of the planetary gear set element crosses zero, and the planet carrier (PT), which is connected in a rotationally fixed manner to the second functional wheel (FR2), functions as an output element of the planetary gear set (PS) and drives the first transmission input shaft (GE1) of the first sub-transmission (TG1).

16. The method according to claim 15, further comprising after the shift element (B) is engaged, reducing the hydrodynamic transfer torque by at least partially draining the working chamber (FL), and reducing a drive torque of either the internal combustion engine (VM) or the electric machine (EM).

17. The method according to claim 15, further comprising: setting a retarder function by building up the hydrodynamic transfer torque by filling the working chamber (FL) with the shift element (B) engaged and, therefore, with the first functional wheel (FR1) fixed.

18. A drive device for a vehicle comprising:
   an internal combustion engine (VM);
   a multistage manual transmission (SG) having a first transmission input shaft (GE1), and a second transmission input shaft (GE2);
   a clutch module (EM/X/K, DK) drivingly coupling the first transmission input shaft (GE1) to the internal combustion engine (VM) via either a first clutch (K1, K1') or a coupling shift element (X), and the clutch module (EM/X/K, DK) drivingly couples the second transmission input shaft (GE2) to the internal combustion engine (VM) via either a second clutch (K2) or a hybrid clutch (K);
   a start-up element (AR, AR', AR") being drivingly connected to the first transmission input shaft (GE1), the start-up element (AR, AR', AR") having a hydrodynamic transfer element (HK, HD, HB) and a planetary gear set (PS) coupled to one another so as to form a single unit;
   the hydrodynamic transfer element having a first functional wheel (FR1, STa, STb) and a second functional wheel (FR2, RT), the first and the second functional wheels together forming a working chamber (FL, FLa, FLb) which fills with fluid to generate a hydrodynamic transfer torque such that at least one start-up function, transferred only to the first sub-transmission (TG1), is implemented by the start-up element (AR, AR', AR"); and
   the second transmission input shaft (GE2) is drivingly disconnected from the at least one hydrodynamic transfer element (HK) and drivingly directly connected to either the second clutch (K2) or the hybrid clutch (K) such that the hydrodynamic transfer torque generated by the at least one hydrodynamic transfer element (HK) is not transferred to the second sub-transmission (TG2);

first and second countershafts (VW1, VW2), are disposed coaxially over one another and are drivingly connected to a respective one of the first and the second transmission input shafts (GE1, GE2) by one gear set (EK, G6) having two meshing gearwheels;

both of the first and the second countershafts (VW1, VW2) are associated with at least three gear sets (G1, G2, G3, G4, G6 G5, G7, EK, RG);

one of a ring gear (HR) or a sun gear (SR) of the planetary gear set is connected, in a rotationally fixed manner, to the first functional wheel (FR1) of hydrodynamic transfer element (HK) and is fixable, by a shift element (B, UK), to a stationary component (GH);

another of the ring gear (HR) or the sun gear (SR) of the planetary gear set is connected, in a rotationally fixed manner, to one of a drive shaft (AN_EM) of an electric machine (EM), a drive shaft (K1_AN) of the first clutch (K1), or an input shaft (K2'_AN) of the second clutch (K2'); and the start-up, element (AR, AR', AR") is arranged on the first transmission input shaft (GE1) downstream of the clutch module and upstream of the first sub-transmission (TG1).

* * * * *